US008632613B2

(12) United States Patent
Braunecker et al.

(10) Patent No.: US 8,632,613 B2
(45) Date of Patent: Jan. 21, 2014

(54) PROCESS FOR APPLYING ONE OR MORE TREATMENT AGENTS TO A TEXTILE WEB

(75) Inventors: Laura Braunecker, Cumming, GA (US); Thomas David Ehlert, Neenah, WI (US); Tony Fedel, Alpharetta, GA (US); Robert Allen Janssen, Alpharetta, GA (US); John Gavin MacDonald, Decatur, GA (US); Patrick Sean McNichols, Hortonville, WI (US); Roland C. Smith, Jr., Gainesville, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 587 days.

(21) Appl. No.: 11/965,435

(22) Filed: Dec. 27, 2007

(65) Prior Publication Data

US 2009/0165223 A1 Jul. 2, 2009

(51) Int. Cl.
*D06P 5/20* (2006.01)
(52) U.S. Cl.
USPC ............................................. 8/444; 427/553
(58) Field of Classification Search
USPC ........................................ 8/115.51; 427/553
See application file for complete search history.

(56) References Cited

U.S. PATENT DOCUMENTS

| | | | |
|---|---|---|---|
| 2,115,056 A | 4/1938 | Samuel | |
| 2,307,206 A | 1/1943 | Fischer | |
| 2,584,053 A | 1/1952 | Seavey et al. | |
| 2,620,894 A | 12/1952 | Peterson et al. | |
| 2,661,192 A | 12/1953 | Horsley et al. | |
| 2,904,981 A | 9/1959 | Macomson | |
| 2,946,981 A | 7/1960 | O'Neill | |
| 3,032,460 A | 5/1962 | Chipman et al. | |
| 3,066,232 A | 11/1962 | Branson | |
| 3,160,138 A | 12/1964 | Platzman | |
| 3,202,281 A | 8/1965 | Weston | |
| 3,239,998 A | 3/1966 | Carter et al. | |

(Continued)

FOREIGN PATENT DOCUMENTS

| CA | 2175065 | 5/1995 |
|---|---|---|
| CH | 657067 | 8/1986 |

(Continued)

OTHER PUBLICATIONS

English machine translation of Nagel WO 2006/074921 A1, accessed on the EPO website.*

(Continued)

*Primary Examiner* — Harold Pyon
*Assistant Examiner* — Katie L Hammer
(74) *Attorney, Agent, or Firm* — Armstrong Teasdale LLP

(57) ABSTRACT

A process for treating a textile web includes applying a first treatment agent to the web. The web is moved in an open configuration over a contact surface of an ultrasonic vibration system. The ultrasonic vibration system is operated to impart ultrasonic energy to the textile web to facilitate the distribution of the first treatment agent through a first extent of the thickness of the textile web. A second treatment agent is applied to the web. The web is moved in an open configuration thereof over a contact surface of an ultrasonic vibration system. The ultrasonic vibration system is operated to impart ultrasonic energy to the textile web to facilitate the distribution of the second treatment agent through a second extent of the thickness of the web. The second extent is different than the first extent.

19 Claims, 13 Drawing Sheets

(56) References Cited

U.S. PATENT DOCUMENTS

| | | |
|---|---|---|
| 3,246,881 A | 4/1966 | Davidson et al. |
| 3,249,453 A | 5/1966 | Schnoring et al. |
| 3,273,631 A | 9/1966 | Neuman |
| 3,275,787 A | 9/1966 | Newberry |
| 3,278,165 A | 10/1966 | Gaffney |
| 3,284,991 A | 11/1966 | Ploeger et al. |
| 3,325,348 A | 6/1967 | Bennett |
| 3,326,470 A | 6/1967 | Loudin et al. |
| 3,338,992 A | 8/1967 | Kinney |
| 3,341,394 A | 9/1967 | Kinney |
| 3,410,116 A | 11/1968 | Levinson |
| 3,425,951 A | 2/1969 | Ishiwata |
| 3,463,321 A | 8/1969 | VanIngen |
| 3,471,248 A | 10/1969 | Schaeuble |
| 3,479,873 A | 11/1969 | Hermanns |
| 3,484,179 A | 12/1969 | Adams et al. |
| 3,490,584 A | 1/1970 | Balamuth |
| 3,502,763 A | 3/1970 | Hartman |
| 3,519,251 A | 7/1970 | Nystrom et al. |
| 3,519,517 A | 7/1970 | Dench |
| 3,542,345 A | 11/1970 | Kuris |
| 3,542,615 A | 11/1970 | Dobo et al. |
| 3,567,185 A | 3/1971 | Ross et al. |
| 3,584,389 A | 6/1971 | Hilton et al. |
| 3,591,946 A | 7/1971 | Loe |
| 3,620,875 A | 11/1971 | Guglielmo, Sr. et al. |
| 3,620,876 A | 11/1971 | Guglielmo, Sr. et al. |
| 3,653,952 A | 4/1972 | Gagliardi |
| 3,664,191 A | 5/1972 | Hermanns |
| 3,672,066 A | 6/1972 | Stephansen |
| 3,673,140 A | 6/1972 | Ackerman et al. |
| 3,692,618 A | 9/1972 | Dorschner et al. |
| 3,707,773 A | 1/1973 | Wolfberg et al. |
| 3,782,547 A | 1/1974 | Dietert |
| 3,802,817 A | 4/1974 | Matsuki et al. |
| 3,829,328 A | 8/1974 | Blustain |
| 3,849,241 A | 11/1974 | Butin et al. |
| 3,865,350 A | 2/1975 | Burtis |
| 3,873,071 A | 3/1975 | Tatebe |
| 3,888,715 A | 6/1975 | Fraser et al. |
| 3,902,414 A | 9/1975 | Zimmer |
| 3,904,392 A | 9/1975 | VanIngen et al. |
| 3,932,129 A | 1/1976 | Porter |
| 4,035,151 A | 7/1977 | Czerny et al. |
| 4,046,073 A | 9/1977 | Mitchell et al. |
| 4,060,438 A | 11/1977 | Johnson |
| 4,062,768 A | 12/1977 | Elliot |
| 4,070,167 A | 1/1978 | Barbee et al. |
| 4,086,112 A | 4/1978 | Porter |
| 4,122,797 A | 10/1978 | Kawamura et al. |
| 4,131,424 A | 12/1978 | Cocoros |
| 4,156,626 A | 5/1979 | Souder |
| 4,168,295 A | 9/1979 | Sawyer |
| 4,210,674 A | 7/1980 | Mitchell |
| 4,218,221 A | 8/1980 | Cottell |
| 4,234,775 A | 11/1980 | Wolfberg et al. |
| 4,242,091 A | 12/1980 | Feess et al. |
| 4,249,986 A | 2/1981 | Obeda |
| 4,259,021 A | 3/1981 | Goudy, Jr. |
| 4,260,389 A * | 4/1981 | Lister ............... 8/149.1 |
| 4,266,879 A | 5/1981 | McFall |
| 4,274,209 A | 6/1981 | Kawaguchi |
| 4,302,485 A | 11/1981 | Last et al. |
| 4,339,295 A | 7/1982 | Boretos et al. |
| 4,340,563 A | 7/1982 | Appel et al. |
| 4,365,422 A | 12/1982 | Kawaguchi |
| 4,372,296 A | 2/1983 | Fahim |
| 4,379,710 A | 4/1983 | Crounse |
| 4,393,671 A | 7/1983 | Ito |
| 4,398,925 A | 8/1983 | Trinh et al. |
| 4,413,069 A | 11/1983 | Marshall |
| 4,419,160 A | 12/1983 | Wang et al. |
| 4,425,718 A * | 1/1984 | Kawaguchi ............... 34/259 |
| 4,482,239 A | 11/1984 | Hosono et al. |
| 4,483,571 A | 11/1984 | Mishiro |
| 4,494,956 A | 1/1985 | Schafer et al. |
| 4,511,254 A | 4/1985 | North et al. |
| 4,511,520 A | 4/1985 | Bowen |
| 4,548,611 A | 10/1985 | Paterson et al. |
| 4,556,467 A | 12/1985 | Kuhn |
| 4,602,055 A | 7/1986 | Schafer et al. |
| 4,612,016 A * | 9/1986 | Jaeger et al. ............... 8/543 |
| 4,612,018 A | 9/1986 | Tsuboi et al. |
| 4,626,642 A | 12/1986 | Wang et al. |
| 4,662,969 A | 5/1987 | Wang |
| 4,663,220 A | 5/1987 | Wisneski et al. |
| 4,673,512 A | 6/1987 | Schram |
| 4,693,879 A | 9/1987 | Yoshimura et al. |
| 4,699,636 A | 10/1987 | Bofinger et al. |
| 4,706,509 A | 11/1987 | Riebel |
| 4,707,402 A | 11/1987 | Thorsrud |
| 4,708,878 A | 11/1987 | Hagelauer et al. |
| 4,726,522 A | 2/1988 | Kokubo et al. |
| 4,743,361 A | 5/1988 | Schram |
| 4,751,529 A | 6/1988 | Elrod et al. |
| 4,848,159 A | 7/1989 | Kennedy et al. |
| 4,861,342 A | 8/1989 | Danel |
| 4,877,516 A | 10/1989 | Schram |
| 4,879,011 A | 11/1989 | Schram |
| 4,879,564 A | 11/1989 | Long |
| 4,906,497 A | 3/1990 | Hellmann et al. |
| 4,929,279 A | 5/1990 | Hays |
| 4,945,121 A | 7/1990 | Micale et al. |
| 4,969,968 A | 11/1990 | Leatherman |
| RE33,524 E | 1/1991 | Schram |
| 4,983,045 A | 1/1991 | Taniguchi |
| 4,991,539 A | 2/1991 | Sarda |
| 4,992,636 A | 2/1991 | Namiki |
| 5,002,587 A | 3/1991 | Berendt |
| 5,006,266 A | 4/1991 | Schram |
| 5,026,167 A | 6/1991 | Berliner, III |
| 5,028,237 A | 7/1991 | Berendt |
| 5,032,027 A | 7/1991 | Berliner, III |
| 5,059,249 A | 10/1991 | Hays |
| 5,096,532 A | 3/1992 | Neuwirth et al. |
| 5,110,403 A | 5/1992 | Ehlert |
| 5,122,165 A | 6/1992 | Wang et al. |
| 5,164,094 A | 11/1992 | Stuckart |
| 5,169,067 A | 12/1992 | Matsusaka et al. |
| 5,169,571 A | 12/1992 | Buckley |
| 5,171,387 A | 12/1992 | Wuchinich |
| 5,189,078 A | 2/1993 | Johnson et al. |
| 5,193,362 A | 3/1993 | Otto |
| 5,193,913 A | 3/1993 | Rosenbaum |
| 5,217,768 A | 6/1993 | Walters et al. |
| 5,220,346 A | 6/1993 | Carreira et al. |
| 5,238,975 A | 8/1993 | Johnson et al. |
| 5,242,557 A | 9/1993 | Jones et al. |
| 5,244,525 A | 9/1993 | Neuwith et al. |
| 5,246,467 A | 9/1993 | Cockett et al. |
| 5,258,413 A | 11/1993 | Isayev |
| 5,269,297 A | 12/1993 | Weng et al. |
| 5,272,216 A | 12/1993 | Clark, Jr. et al. |
| 5,326,164 A | 7/1994 | Logan |
| 5,330,100 A | 7/1994 | Malinowski |
| 5,335,449 A | 8/1994 | Beatty |
| 5,338,611 A | 8/1994 | Lause et al. |
| 5,340,649 A | 8/1994 | Roeker et al. |
| 5,346,932 A | 9/1994 | Takahashi et al. |
| 5,368,199 A | 11/1994 | Haas et al. |
| 5,372,634 A | 12/1994 | Monahan |
| 5,373,212 A | 12/1994 | Beau |
| 5,375,926 A | 12/1994 | Omasa |
| 5,391,000 A | 2/1995 | Taniguchi |
| 5,400,460 A | 3/1995 | Roeker et al. |
| 5,423,260 A | 6/1995 | Goldberg et al. |
| 5,442,160 A | 8/1995 | Kimrey, Jr. et al. |
| 5,446,270 A | 8/1995 | Chamberlain et al. |
| 5,451,446 A | 9/1995 | Kincaid et al. |
| 5,466,722 A | 11/1995 | Stoffer et al. |
| 5,487,853 A | 1/1996 | Buckley |
| 5,500,668 A | 3/1996 | Malhotra et al. |
| 5,519,670 A | 5/1996 | Walter |
| 5,536,921 A | 7/1996 | Herdrick et al. |

(56) References Cited

U.S. PATENT DOCUMENTS

| | | |
|---|---|---|
| 5,543,605 A | 8/1996 | Kimrey, Jr. et al. |
| 5,563,644 A | 10/1996 | Isganitis et al. |
| 5,583,292 A | 12/1996 | Karbach et al. |
| 5,585,565 A | 12/1996 | Glascock et al. |
| 5,603,795 A | 2/1997 | Paulauskas et al. |
| 5,631,685 A | 5/1997 | Gooray et al. |
| 5,652,019 A | 7/1997 | Moran |
| 5,665,383 A | 9/1997 | Grinstaff et al. |
| 5,681,457 A | 10/1997 | Mahoney |
| 5,709,737 A | 1/1998 | Malhotra et al. |
| 5,711,888 A | 1/1998 | Trampler et al. |
| 5,770,124 A | 6/1998 | Marecki et al. |
| 5,770,296 A | 6/1998 | Remerowski et al. |
| 5,798,395 A | 8/1998 | Lauf et al. |
| 5,803,270 A | 9/1998 | Brodeur |
| 5,804,801 A | 9/1998 | Lauf et al. |
| 5,810,037 A | 9/1998 | Sasaki et al. |
| 5,814,138 A | 9/1998 | Fague |
| 5,831,166 A | 11/1998 | Kozuka et al. |
| 5,851,274 A | 12/1998 | Lin |
| 5,853,456 A | 12/1998 | Bryan et al. |
| 5,853,469 A | 12/1998 | Colt et al. |
| 5,856,245 A | 1/1999 | Caldwell et al. |
| 5,868,153 A | 2/1999 | Cohen et al. |
| 5,871,872 A | 2/1999 | Matijevic et al. |
| 5,873,968 A | 2/1999 | Pike et al. |
| 5,902,489 A | 5/1999 | Yasuda et al. |
| 5,913,904 A | 6/1999 | Meyer et al. |
| 5,916,203 A | 6/1999 | Brandon et al. |
| 5,922,355 A | 7/1999 | Parikh et al. |
| 5,935,883 A | 8/1999 | Pike |
| 5,937,906 A | 8/1999 | Kozyuk |
| 5,964,926 A | 10/1999 | Cohen |
| 5,979,664 A | 11/1999 | Brodeur |
| 5,984,468 A | 11/1999 | Malhotra et al. |
| 5,989,475 A | 11/1999 | Schulthess et al. |
| 6,007,662 A | 12/1999 | Remerowski et al. |
| 6,010,592 A | 1/2000 | Jameson et al. |
| 6,019,921 A | 2/2000 | Lutz |
| 6,020,277 A | 2/2000 | Jameson |
| 6,024,822 A | 2/2000 | Alper et al. |
| 6,035,897 A | 3/2000 | Kozyuk |
| 6,045,648 A | 4/2000 | Palmgreen et al. |
| 6,053,028 A | 4/2000 | Kraus, Jr. et al. |
| 6,053,424 A | 4/2000 | Gipson et al. |
| 6,055,859 A | 5/2000 | Kozuka et al. |
| 6,060,416 A | 5/2000 | Kobata et al. |
| 6,074,466 A | 6/2000 | Iwasa |
| 6,089,702 A | 7/2000 | Hilton |
| 6,090,731 A | 7/2000 | Pike et al. |
| 6,103,812 A | 8/2000 | Wei et al. |
| 6,106,590 A | 8/2000 | Ueno et al. |
| 6,114,676 A | 9/2000 | Jerby et al. |
| 6,117,192 A | 9/2000 | Tate |
| 6,129,767 A | 10/2000 | Hong |
| 6,169,045 B1 | 1/2001 | Pike et al. |
| 6,200,486 B1 | 3/2001 | Chahine et al. |
| 6,203,151 B1 | 3/2001 | Ruhe |
| 6,218,483 B1 | 4/2001 | Muthiah et al. |
| 6,221,258 B1 | 4/2001 | Feke et al. |
| 6,254,787 B1 | 7/2001 | Kimura et al. |
| 6,266,836 B1 | 7/2001 | Gallego Juarez et al. |
| 6,303,061 B1 | 10/2001 | Hewins |
| 6,315,215 B1 | 11/2001 | Gipson et al. |
| 6,322,240 B1 | 11/2001 | Omasa |
| 6,332,541 B1 | 12/2001 | Coakley et al. |
| 6,348,679 B1 | 2/2002 | Ryan et al. |
| 6,350,792 B1 | 2/2002 | Smetana et al. |
| 6,361,697 B1 | 3/2002 | Coury et al. |
| 6,368,414 B1 | 4/2002 | Johnson |
| 6,368,994 B1 | 4/2002 | Sklyarevich |
| 6,380,264 B1 | 4/2002 | Jameson et al. |
| 6,381,995 B1 | 5/2002 | Hong |
| 6,383,301 B1 | 5/2002 | Bell et al. |
| 6,409,329 B1 | 6/2002 | King |
| 6,419,798 B1 | 7/2002 | Topolkaraev et al. |
| 6,425,663 B1 | 7/2002 | Eastlund et al. |
| 6,431,702 B2 | 8/2002 | Ruhe |
| 6,436,513 B1 | 8/2002 | Kitamura et al. |
| 6,444,964 B1 | 9/2002 | Eastlund et al. |
| 6,450,417 B1 | 9/2002 | Gipson et al. |
| 6,457,823 B1 | 10/2002 | Cleary et al. |
| 6,467,350 B1 | 10/2002 | Kaduchak et al. |
| 6,482,327 B1 | 11/2002 | Mori et al. |
| 6,506,584 B1 | 1/2003 | Chandler et al. |
| 6,508,550 B1 | 1/2003 | Eastlund et al. |
| 6,547,903 B1 | 4/2003 | McNichols et al. |
| 6,547,935 B2 | 4/2003 | Scott |
| 6,547,951 B1 | 4/2003 | Maekawa |
| 6,551,607 B1 | 4/2003 | Minerath, III |
| 6,566,414 B2 | 5/2003 | Takeshima et al. |
| 6,576,042 B2 | 6/2003 | Kraus et al. |
| 6,578,959 B1 | 6/2003 | Sceccombe |
| 6,582,611 B1 | 6/2003 | Kerfoot |
| 6,593,436 B2 | 7/2003 | Austin et al. |
| 6,600,142 B2 | 7/2003 | Ryan et al. |
| 6,605,252 B2 | 8/2003 | Omasa |
| 6,605,651 B1 | 8/2003 | Stangel |
| 6,617,588 B1 | 9/2003 | Sato |
| 6,620,226 B2 | 9/2003 | Hutton et al. |
| 6,624,100 B1 | 9/2003 | Pike et al. |
| 6,627,265 B2 | 9/2003 | Kutilek |
| 6,646,026 B2 | 11/2003 | Fan et al. |
| 6,649,888 B2 | 11/2003 | Ryan et al. |
| 6,652,602 B2 | 11/2003 | Yang et al. |
| 6,655,826 B1 | 12/2003 | Leanos |
| 6,659,365 B2 | 12/2003 | Gipson et al. |
| 6,663,239 B2 | 12/2003 | Wotton et al. |
| 6,673,178 B2 | 1/2004 | Ellner et al. |
| 6,676,003 B2 | 1/2004 | Ehlert et al. |
| 6,683,287 B2 | 1/2004 | Behnke et al. |
| 6,686,573 B2 | 2/2004 | Behnke et al. |
| 6,689,730 B2 | 2/2004 | Hortel et al. |
| 6,719,422 B2 | 4/2004 | Wu et al. |
| 6,734,409 B1 | 5/2004 | Wang et al. |
| 6,739,524 B2 | 5/2004 | Taylor-McCune et al. |
| 6,770,600 B1 | 8/2004 | Lamola |
| 6,783,623 B2 | 8/2004 | Morin et al. |
| 6,817,541 B2 | 11/2004 | Sands et al. |
| 6,818,128 B2 | 11/2004 | Minter |
| 6,822,135 B2 | 11/2004 | Soerens et al. |
| 6,837,445 B1 | 1/2005 | Tsai |
| 6,841,921 B2 | 1/2005 | Stegelmann |
| 6,846,448 B2 | 1/2005 | Rymer et al. |
| 6,855,760 B1 | 2/2005 | Kirsten et al. |
| 6,858,181 B2 | 2/2005 | Aoyagi |
| 6,866,378 B2 | 3/2005 | Wotton et al. |
| 6,878,288 B2 | 4/2005 | Scott |
| 6,883,724 B2 | 4/2005 | Adiga et al. |
| 6,890,593 B2 | 5/2005 | Tian |
| 6,897,628 B2 | 5/2005 | Gunnerman |
| 6,901,683 B2 | 6/2005 | Lyle et al. |
| 6,902,650 B2 | 6/2005 | Park et al. |
| 6,911,153 B2 | 6/2005 | Minter |
| 6,929,750 B2 | 8/2005 | Laurell et al. |
| 6,935,770 B2 | 8/2005 | Schueler |
| 6,936,151 B1 | 8/2005 | Lock |
| 6,938,683 B2 | 9/2005 | Lin |
| 7,018,546 B2 | 3/2006 | Kurihara et al. |
| 7,034,266 B1 | 4/2006 | DeGroot et al. |
| 7,083,322 B2 | 8/2006 | Moore et al. |
| 7,083,764 B2 | 8/2006 | Scott |
| 7,090,391 B2 | 8/2006 | Taniguchi |
| 7,108,137 B2 | 9/2006 | Lal et al. |
| 7,150,779 B2 | 12/2006 | Meegan, Jr. |
| 7,156,201 B2 | 1/2007 | Peshkovskiy et al. |
| 7,186,772 B2 | 3/2007 | Berkau et al. |
| 7,293,909 B2 | 11/2007 | Taniguchi |
| 7,322,431 B2 | 1/2008 | Ratcliff |
| 7,338,551 B2 | 3/2008 | Kozyuk |
| 7,404,666 B2 | 7/2008 | Tessien |
| 7,414,009 B2 | 8/2008 | Tanaka et al. |
| 7,419,519 B2 | 9/2008 | Li et al. |
| 7,424,883 B2 | 9/2008 | McNichols et al. |

(56) References Cited

U.S. PATENT DOCUMENTS

| | | |
|---|---|---|
| 7,465,426 B2 | 12/2008 | Kerherve et al. |
| 7,504,075 B2 | 3/2009 | Marhasin |
| 7,516,664 B2 | 4/2009 | Meier et al. |
| 7,533,830 B1 | 5/2009 | Rose |
| 7,582,156 B2 | 9/2009 | Tanaka et al. |
| 7,673,516 B2 | 3/2010 | Janssen et al. |
| 7,703,698 B2 | 4/2010 | Janssen et al. |
| 7,712,353 B2 | 5/2010 | Janssen et al. |
| 7,735,751 B2 | 6/2010 | Ehlert et al. |
| 7,780,743 B2 | 8/2010 | Greaves et al. |
| 7,785,674 B2 | 8/2010 | Janssen et al. |
| 2001/0040935 A1 | 11/2001 | Case |
| 2002/0036173 A1 | 3/2002 | Feke et al. |
| 2002/0074380 A1 | 6/2002 | Ellner et al. |
| 2002/0079121 A1 | 6/2002 | Ryan et al. |
| 2002/0133888 A1 | 9/2002 | Boyes |
| 2002/0142106 A1 | 10/2002 | Bethune et al. |
| 2002/0164274 A1 | 11/2002 | Haggett et al. |
| 2003/0042174 A1 | 3/2003 | Austin |
| 2003/0047067 A1 | 3/2003 | Kraus et al. |
| 2003/0048692 A1 | 3/2003 | Cohen et al. |
| 2003/0051989 A1 | 3/2003 | Austin |
| 2003/0061939 A1 | 4/2003 | Hutton et al. |
| 2003/0066899 A1 | 4/2003 | Gibson |
| 2003/0116014 A1 | 6/2003 | Possanza et al. |
| 2003/0116888 A1 | 6/2003 | Rymer et al. |
| 2003/0118814 A1 | 6/2003 | Workman, Jr. et al. |
| 2003/0118825 A1 | 6/2003 | Melius et al. |
| 2003/0119406 A1 | 6/2003 | Abuto |
| 2003/0143110 A1 | 7/2003 | Kritzler |
| 2003/0194692 A1 | 10/2003 | Purdum |
| 2003/0234173 A1 | 12/2003 | Minter |
| 2004/0022695 A1 | 2/2004 | Simon et al. |
| 2004/0065599 A1 | 4/2004 | Lal et al. |
| 2004/0079580 A1 | 4/2004 | Manna et al. |
| 2004/0120904 A1 | 6/2004 | Lye et al. |
| 2004/0130606 A1 | 7/2004 | Tawaraya et al. |
| 2004/0142041 A1 | 7/2004 | MacDonald et al. |
| 2004/0179076 A1 | 9/2004 | Cohen et al. |
| 2004/0187524 A1 | 9/2004 | Sen et al. |
| 2004/0202728 A1 | 10/2004 | Shanker et al. |
| 2004/0222080 A1 | 11/2004 | Tour et al. |
| 2004/0232583 A1 | 11/2004 | Monsheimer et al. |
| 2005/0000914 A1 | 1/2005 | Dahlberg et al. |
| 2005/0008560 A1 | 1/2005 | Kataoka et al. |
| 2005/0017599 A1 | 1/2005 | Puskas |
| 2005/0025797 A1 | 2/2005 | Wang |
| 2005/0082234 A1 | 4/2005 | Solenthaler |
| 2005/0084438 A1 | 4/2005 | Do et al. |
| 2005/0084464 A1 | 4/2005 | McGrath et al. |
| 2005/0085144 A1 | 4/2005 | MacDonald et al. |
| 2005/0092931 A1 | 5/2005 | Gadgil et al. |
| 2005/0100812 A1 | 5/2005 | Schultheis et al. |
| 2005/0129161 A1 | 6/2005 | Laberge |
| 2005/0132906 A1 | 6/2005 | Fernfors et al. |
| 2005/0202578 A1 | 9/2005 | Yaniv et al. |
| 2005/0208303 A1 | 9/2005 | Atarashi et al. |
| 2005/0235740 A1 | 10/2005 | Desie et al. |
| 2005/0238804 A1 | 10/2005 | Garber et al. |
| 2005/0260106 A1 | 11/2005 | Marhasin |
| 2006/0000034 A1 | 1/2006 | McGrath |
| 2006/0008442 A1 | 1/2006 | MacDonald et al. |
| 2006/0120212 A1 | 6/2006 | Taniguchi et al. |
| 2006/0207431 A1 | 9/2006 | Beca et al. |
| 2007/0114306 A1 | 5/2007 | Kawakami et al. |
| 2007/0119785 A1 | 5/2007 | Englehardt et al. |
| 2007/0131034 A1 | 6/2007 | Ehlert et al. |
| 2007/0170277 A1 | 7/2007 | Ehlert |
| 2008/0061000 A1 | 3/2008 | Janssen et al. |
| 2008/0062811 A1 | 3/2008 | Janssen et al. |
| 2008/0063718 A1 | 3/2008 | Janssen et al. |
| 2008/0063806 A1 | 3/2008 | Janssen et al. |
| 2008/0067418 A1 | 3/2008 | Ross |
| 2008/0069887 A1 | 3/2008 | Baran et al. |
| 2008/0117711 A1 | 5/2008 | Omasa |
| 2008/0155762 A1 | 7/2008 | Janssen et al. |
| 2008/0155763 A1 | 7/2008 | Janssen et al. |
| 2008/0156428 A1 | 7/2008 | Janssen et al. |
| 2008/0156737 A1 | 7/2008 | Janssen et al. |
| 2008/0159063 A1 | 7/2008 | Janssen et al. |
| 2008/0192568 A1 | 8/2008 | Hielscher et al. |
| 2008/0251375 A1 | 10/2008 | Hielscher et al. |
| 2009/0014377 A1 | 1/2009 | Janssen et al. |
| 2009/0147905 A1 | 6/2009 | Janssen et al. |
| 2009/0155091 A1 | 6/2009 | Ehlert et al. |
| 2009/0158936 A1 | 6/2009 | Janssen et al. |
| 2009/0162258 A1 | 6/2009 | Janssen et al. |
| 2009/0165654 A1 | 7/2009 | Koenig et al. |
| 2009/0166177 A1 | 7/2009 | Wenzel et al. |
| 2009/0168590 A1 | 7/2009 | Koenig et al. |
| 2009/0168591 A1 | 7/2009 | Wenzel et al. |
| 2009/0262597 A1 | 10/2009 | Kieffer et al. |
| 2010/0150859 A1 | 6/2010 | Do et al. |
| 2010/0206742 A1 | 8/2010 | Janssen et al. |
| 2010/0296975 A1 | 11/2010 | Peshkovsky et al. |

FOREIGN PATENT DOCUMENTS

| | | |
|---|---|---|
| CN | 1535249 A | 10/2004 |
| CN | 1247628 | 3/2006 |
| CN | 101153138 | 4/2008 |
| DE | 2056104 | 5/1972 |
| DE | 2131878 A1 | 2/1973 |
| DE | 3325958 | 2/1985 |
| DE | 262553 A3 | 12/1988 |
| DE | 9017338 | 3/1991 |
| DE | 4344455 | 6/1995 |
| DE | 4444525 | 6/1996 |
| DE | 19703634 | 10/1997 |
| DE | 19854013 | 5/2000 |
| DE | 29923223 | 7/2000 |
| DE | 19911683 | 9/2000 |
| DE | 19913179 | 9/2000 |
| DE | 19913397 | 9/2000 |
| DE | 19938254 | 2/2001 |
| DE | 10015144 A1 | 10/2001 |
| DE | 10245201 | 4/2004 |
| DE | 29825063 | 6/2004 |
| DE | 10353804 | 6/2005 |
| DE | 102004040233 | 3/2006 |
| DE | 102005025118 | 1/2007 |
| DE | 102005034629 | 1/2007 |
| EP | 0041779 | 12/1981 |
| EP | 0063203 | 10/1982 |
| EP | 0065057 | 11/1982 |
| EP | 0065058 | 11/1982 |
| EP | 0003684 | 5/1983 |
| EP | 0031862 | 2/1984 |
| EP | 0141556 | 5/1985 |
| EP | 0170758 | 2/1986 |
| EP | 0188105 | 7/1986 |
| EP | 0212655 | 3/1987 |
| EP | 0269941 A1 | 6/1988 |
| EP | 0292470 | 11/1988 |
| EP | 347891 | 12/1989 |
| EP | 0455265 | 11/1991 |
| EP | 0457187 A2 | 11/1991 |
| EP | 0459967 | 12/1991 |
| EP | 0281041 | 9/1992 |
| EP | 0549542 | 6/1993 |
| EP | 0303803 | 6/1994 |
| EP | 625482 | 11/1994 |
| EP | 0625606 | 11/1994 |
| EP | 648531 | 4/1995 |
| EP | 0648531 | 4/1995 |
| EP | 0282015 | 6/1995 |
| EP | 0667245 | 8/1995 |
| EP | 0798116 | 10/1997 |
| EP | 0894612 A2 | 2/1999 |
| EP | 0907423 | 4/1999 |
| EP | 0969131 | 1/2000 |
| EP | 0984045 | 3/2000 |
| EP | 1010796 | 6/2000 |
| EP | 1029651 | 8/2000 |

(56) References Cited

FOREIGN PATENT DOCUMENTS

| | | |
|---|---|---|
| EP | 1238034 | 12/2003 |
| EP | 1371697 | 12/2003 |
| EP | 1375432 A1 | 2/2004 |
| EP | 0984045 | 9/2004 |
| EP | 1541322 | 6/2005 |
| EP | 1954388 | 3/2007 |
| EP | 0983968 | 3/2008 |
| EP | 2173669 A2 | 4/2010 |
| EP | 2176173 A2 | 4/2010 |
| FR | 2175286 | 10/1973 |
| FR | 2793811 | 11/2000 |
| FR | 2832703 A1 | 5/2005 |
| FR | 2878536 | 6/2006 |
| GB | 631882 | 11/1949 |
| GB | 850365 | 10/1960 |
| GB | 1124787 | 8/1968 |
| GB | 1229200 | 4/1971 |
| GB | 1257807 | 12/1971 |
| GB | 1363277 | 8/1974 |
| GB | 1404575 | 9/1975 |
| GB | 1466735 | 3/1977 |
| GB | 1482755 | 8/1977 |
| GB | 1583953 | 2/1981 |
| GB | 2120497 | 11/1983 |
| GB | 2350321 | 11/2000 |
| JP | 5468842 | 6/1979 |
| JP | 55107490 | 8/1980 |
| JP | 56028221 | 3/1981 |
| JP | 58034051 | 2/1983 |
| JP | 59171682 | 9/1984 |
| JP | 60101090 | 6/1985 |
| JP | 61291190 | 12/1986 |
| JP | 62001413 A | 1/1987 |
| JP | 62039839 U | 3/1987 |
| JP | 63072364 | 4/1988 |
| JP | 63104664 | 5/1988 |
| JP | 63318438 | 12/1988 |
| JP | 1108081 | 4/1989 |
| JP | 1163074 | 6/1989 |
| JP | 01213458 | 8/1989 |
| JP | 1213486 | 8/1989 |
| JP | 2025602 | 1/1990 |
| JP | 2167700 | 6/1990 |
| JP | 2220812 | 9/1990 |
| JP | 2262178 | 10/1990 |
| JP | 02281185 A | 11/1990 |
| JP | 336034 | 2/1991 |
| JP | 03053195 A | 3/1991 |
| JP | 3086258 | 4/1991 |
| JP | 3099883 | 4/1991 |
| JP | 03-157129 A | 5/1991 |
| JP | 3137283 | 6/1991 |
| JP | 3244594 | 10/1991 |
| JP | 57119853 | 12/1991 |
| JP | 04257445 | 9/1992 |
| JP | 6228824 | 8/1994 |
| JP | 7198257 | 8/1995 |
| JP | 7314661 | 12/1995 |
| JP | 8304388 | 11/1996 |
| JP | 9286943 | 11/1997 |
| JP | 10060331 | 3/1998 |
| JP | 10112384 | 4/1998 |
| JP | 10112385 | 4/1998 |
| JP | 10112386 | 4/1998 |
| JP | 10112387 | 4/1998 |
| JP | 10315336 | 12/1998 |
| JP | 1134590 | 2/1999 |
| JP | 11133661 | 5/1999 |
| JP | 2000144582 | 5/2000 |
| JP | 2000158364 | 6/2000 |
| JP | 2001017970 | 1/2001 |
| JP | 2001228733 | 8/2001 |
| JP | 2001252588 | 9/2001 |
| JP | 2002210920 | 7/2002 |
| JP | 2003103152 A | 4/2003 |
| JP | 2004020176 | 1/2004 |
| JP | 2004082530 | 3/2004 |
| JP | 2004238012 | 8/2004 |
| JP | 2005118688 | 5/2005 |
| KR | 20020073778 A | 9/2002 |
| KR | 1020050013858 A | 2/2005 |
| KR | 1020050113356 A | 12/2005 |
| SU | 203582 A | 1/1967 |
| WO | 8910258 | 11/1989 |
| WO | 9117889 | 11/1991 |
| WO | 9400757 | 1/1994 |
| WO | 9420833 | 9/1994 |
| WO | 9429873 A | 12/1994 |
| WO | 9600318 | 1/1996 |
| WO | 9609112 A1 | 3/1996 |
| WO | 9620784 | 7/1996 |
| WO | 9628599 | 9/1996 |
| WO | 9743026 | 11/1997 |
| WO | 9817373 | 4/1998 |
| WO | 9822250 | 5/1998 |
| WO | 9844058 | 10/1998 |
| WO | 9933520 | 7/1999 |
| WO | 9961539 | 12/1999 |
| WO | 0004978 | 2/2000 |
| WO | 0026011 | 5/2000 |
| WO | 0026026 | 5/2000 |
| WO | 0029178 | 5/2000 |
| WO | 0031189 | 6/2000 |
| WO | 0041794 | 7/2000 |
| WO | 0109262 | 2/2001 |
| WO | 0110635 | 2/2001 |
| WO | 0121725 | 3/2001 |
| WO | 0136116 | 5/2001 |
| WO | 0136117 | 5/2001 |
| WO | 0139200 A | 5/2001 |
| WO | 0222252 | 3/2002 |
| WO | 0250511 | 6/2002 |
| WO | 02062894 | 8/2002 |
| WO | 02064354 | 8/2002 |
| WO | 02080668 A2 | 10/2002 |
| WO | 03012800 | 2/2003 |
| WO | 03016030 | 2/2003 |
| WO | 03102737 | 12/2003 |
| WO | 03106143 | 12/2003 |
| WO | 03106573 | 12/2003 |
| WO | 03106600 | 12/2003 |
| WO | 2004011044 | 2/2004 |
| WO | 2004026452 | 4/2004 |
| WO | 2004037902 | 5/2004 |
| WO | 2004048463 | 6/2004 |
| WO | 2004050350 | 6/2004 |
| WO | 2004063295 | 7/2004 |
| WO | 2004064487 | 8/2004 |
| WO | 2004076578 | 9/2004 |
| WO | 2004091841 | 10/2004 |
| WO | 2004092048 | 10/2004 |
| WO | 2005014489 A1 | 2/2005 |
| WO | 2005028577 | 3/2005 |
| WO | 2005073329 | 8/2005 |
| WO | 2005080066 | 9/2005 |
| WO | 2006004765 | 1/2006 |
| WO | 2006037591 | 4/2006 |
| WO | 2006043970 A2 | 4/2006 |
| WO | 2006055038 | 5/2006 |
| WO | 2006073645 A1 | 7/2006 |
| WO | 2006074921 | 7/2006 |
| WO | WO 2006074921 A1 * | 7/2006 |
| WO | 2006093804 | 9/2006 |
| WO | 2007011520 A2 | 1/2007 |
| WO | 2005011804 | 5/2007 |
| WO | 2007060245 A1 | 5/2007 |
| WO | 2007095871 | 8/2007 |
| WO | 2008029379 | 3/2008 |
| WO | 2008047259 | 4/2008 |
| WO | 2008085806 | 7/2008 |

OTHER PUBLICATIONS

U.S. Appl. No. 11/617,417, filed Dec. 28, 2006.

(56) References Cited

OTHER PUBLICATIONS

U.S. Appl. No. 11/777,116, filed Jul. 12, 2007.
U.S. Appl. No. 11/617,405, filed Dec. 28, 2006.
U.S. Appl. No. 11/777,124, filed Jul. 12, 2007.
U.S. Appl. No. 11/646,816, filed Dec. 28, 2006.
U.S. Appl. No. 11/647,534, filed Dec. 28, 2006.
U.S. Appl. No. 11/617,473, filed Dec. 28, 2006.
U.S. Appl. No. 11/777,128, filed Jul. 12, 2007.
U.S. Appl. No. 11/617,523, filed Dec. 28, 2006.
ISR/WO for PCT/IB2007/052946, Dated Dec. 17, 2007.
International Search Report and Written Opinion regarding PCT/IB2007/052947, dated Mar. 12, 2008.
U.S. Appl. No. 11/777,145, filed Jul. 12, 2007.
U.S. Appl. No. 11/777,151, filed Jul. 12, 2007.
International Search Report and Written Opinion regarding PCT/IB2007/052945, dated Feb. 1, 2008.
U.S. Appl. No. 11/530,210, filed Sep. 8, 2006.
U.S. Appl. No. 11/530,311, filed Jan. 26, 2007.
International Search Report and Written Opinion regarding PCT/IB2007/052988, 4 pages, dated Feb. 14, 2008.
U.S. Appl. No. 11/777,140, filed Jul. 12, 2007.
Taleyarkhan, et al., "Evidence for Nuclear Emissions During Acoustic Cavitation," Science, (Mar. 8, 2002), vol. 295, pp. 1868-1873.
Kloeppel, James E., "Temperature inside collapsing bubble four times that of sun," News Bureau, University of Illinois at Urbana-Champaign.
Tal-Figiel B., The Formation of Stable W/O, O/W, W/O/W Cosmetic Emulsions in an Ultrasonic Field, viewed at http://www.atypon-link.com/ICHEME/doi/abs/10.1205/cherd06199 on Oct. 19, 2007.
"Controlled Thermonuclear Fusion," viewed at http://library.thinkquest.org/17940/texts/fusion_controlled/fusion_controlled.html on Oct. 23, 2007.
Flannigan, "Measurement of Pressure and Density Inside a Single Sonoluminescing Bubble," Physical Review Letters (May 26, 2006), PRL 96.
Taleyarkhan, et al., "Additional Evidence of Nuclear Emissions During Acoustic Cavitation," Physcial Review E, (Mar. 2004). vol. 69.
"Thermonuclear Fusion Energy Source for Future Generations," viewed at http://www.crppwww.epfl.ch/crppfusion/ on Oct. 23, 2007.
Peplow, Mark, "Desktop fusion is back on the table," viewed at http://nature.com/news/2006/060109/full/060109-5.html on May 4, 2007.
Lahey, Taleyarkhan, and Nigmatulin, "Bubble Power," IEEE spectrum, May 2005, pp. 39-43.
U.S. Appl. No. 11/963,237, filed Dec. 21, 2007.
Non-final office action regarding U.S. Appl. No. 11/950,943, dated May 1, 2009.
J.D. Lawson, "Some Criteria for a Power Producing Thermonuclear Reactor", Proc. Phys. Soc. B70, pp. 6-10 (1957).
L.A. Artsimovich, "Controlled Thermonuclear Reactions", Gordon and Breach Science Publishers, New York, first English translation, 1964.
D.R.O. Morrison, "Cold Fusion Update No. 9", Jan. 1994, from Newsgroups sci.physics.fusion, http://www.groups.google.com.
Brenner et al, Single-bubble sonoluminescence, Reviews of Modern Physics, vol. 74, Apr. 2002, pp. 425-484.
J. Lister, Plasma Physics and Controlled Fusion 48, pp. 715-716 (2006).
U.S. Department of Energy, "Report of the Review of Low Energy Nuclear Reactions", Dec. 1, 2004 (USDOE).
Non-final office action regarding U.S. Appl. No. 11/617,497, dated Jun. 26, 2009.
Cohen, "The Importance of Viscosity in the Web Coating Process," Web Coating Blog, pp. 1-4 (Mar. 28, 2006).
Final Office Action, U.S. Appl. No. 11/617,405 (Jul. 31, 2009).
Non-final office action regarding U.S. Appl. No. 11/530,311, dated Nov. 5, 2008.
Final office action regarding U.S. Appl. No. 11/617,523, dated Nov. 17, 2008.
Final office action regarding U.S. Appl. No. 11/647,534, dated Dec. 4, 2008.
Non-final office action regarding U.S. Appl. No. 11/646,816, dated Dec. 15, 2008.
Final Office action regarding U.S. Appl. No. 11/646,816, dated Jan. 11, 2010.
Non-final Office Action, U.S. Appl. No. 11/617,417 (Mar. 9, 2009).
International Search Report and Written Opinion regarding PCT/IB2007/054909 dated May 8, 2008.
Non-final Office action regarding U.S. Appl. No. 11/530,198, dated Nov. 18, 2009.
Non-final Office Action regarding U.S. Appl. No. 11/647,534, dated Feb. 11, 2009.
Final Office Action Regarding U.S. Appl. No. 11/530,311, dated Jun. 23, 2009.
International Search Report and Written Opinion regarding PCT/IB2007/054890, dated Apr. 18, 2008.
Non-final Office Action, U.S. Appl. No. 11/777,124 (Apr. 20, 2009).
International Search Report and Written Opinion from PCT/IB2007/054903 dated Apr. 17, 2008.
European Office Action regarding European Application No. 07805228.9, dated Oct. 9, 2009.
Non-final Office action received in U.S. Appl. No. 11/777,128, mailed Jul. 21, 2009.
Birla, M., et al. "Continuous Dyeing of Cotton Using Ultrasound" AATCC Book of Papers, IC&E, 1996, pp. 309-322.
Mathur, M. R., et al. "Energy Conservation in Wet Processing: Development of Low Energy Dyeing Machine." Colourage Annual. 2004. pp. 93-99.
"Ultrasonics Sound Technology for Textiles and Nonwovens" Express Textile, Issue Dated Aug. 21, 2003, 5 pages.
Vajnhandl, S., et al. "Ultrasound in Textile Dyeing and the Decolouration/Mineralization of Textile Dyes" Dyes and Pigments. (2005), 65, pp. 89-101.
Office Action regarding U.S. Appl. No. 11/617,523, dated May 29, 2008.
Office Action regarding U.S. Appl. No. 11/647,534, dated May 30, 2008.
Office Action regarding U.S. Appl. No. 11/646,816, dated May 30, 2008.
Non-final Office Action regarding U.S. Appl. No. 11/617,473, dated Jun. 2, 2009.
International Search Report and Written Opinion regarding PCT/IB2007/054905 dated May 6, 2008.
Non-final office action regarding U.S. Appl. No. 11/617,515, dated Mar. 27, 2009.
Non-Final Office Action Regarding U.S. Appl. No. 11/646,816, dated Jun. 26, 2009.
International Search Report and Written Opinion regarding PCT/IB2007/054898, dated May 15, 2008.
International Search Report and Written Opinion regarding PCT/IB2007/054892 dated May 15, 2008.
Non-final Office Action, U.S. Appl. No. 11/617,405 (Feb. 3, 2009).
Non-final Office Action regarding U.S. Appl. No. 12/335,231, dated Oct. 15, 2009.
Blume, T. and Neis, U. "Improved wastewater disinfection by ultrasonic pre-treatment," Ultrasonics Sonochemistry, 2004, No. 11, pp. 333-336.
International Search Report and Written Opinion regarding PCT/IB2007/054897, dated Apr. 16, 2008.
International Search Report and Written Opinion regarding PCT/IB2007/054889, dated Apr. 16, 2008.
Final Office action regarding U.S. Appl. No. 11/617,417, dated Sep. 22, 2009.
Non-final office action regarding U.S. Appl. No. 11/777,116, dated Sep. 28, 2009.
Machine translation of WO 2006074921 A1, accessed from the EPO website, Accessed on Mar. 15, 2010.
Non-final Office action regarding U.S. Appl. No. 11/777,128, dated Dec. 21, 2009.
Non-final Office action regarding U.S. Appl. No. 11/530,183, dated Apr. 19, 2010.

(56) References Cited

OTHER PUBLICATIONS

Non-final Office Action received in U.S. Appl. No. 11/966,458 mailed Sep. 28, 2010.
First Office Action for China Patent Application No. 200780033331.3, dated Nov. 14, 2011.
Non-final Office action issued in U.S. Appl. No. 11/963,139, dated Feb. 18, 2011.
Non-final Office action issued in U.S. Appl. No. 11/777,140, dated Feb. 23, 2011.
Non-final Office action regarding U.S. Appl. No. 11/963,237, dated Jul. 8, 2010.
Final Office Action Issued for U.S. Appl. No. 11/530,210 mailed Apr. 19, 2011.
First Office Action for China Patent Application No. 20088016947.3, dated Jun. 24, 2011.
First Office Action for Russian Patent Application No. 2009112526, dated Apr. 28, 2011.
Final Office Action issued for U.S. Appl. No. 11/530,210, mailed Jul. 1, 2011.
Non-Final Office Action issued for U.S. Appl. No. 12/335,231, mailed Jul. 13, 2011.
Non-Final Office Action issued for U.S. Appl. No. 12/335,176, mailed Jul. 13, 2011.
Non-Final Office Action issued for U.S. Appl. No. 11/963,139, mailed Jun. 15, 2011.
Non-final Office action issued in related U.S. Appl. No. 11/777,140 on Aug. 9, 2010.
Non-Final Office action issued in related U.S. Appl. No. 11/966,418 on Aug. 2, 2010.
Non-Final Office action issued in related U.S. Appl. No. 11/966,447 on Aug. 2, 2010.
Oct. 27, 2010 Letter regarding the Office action issued for Mexican Patent Application Serial No. MX/a/2009/002519 mailed Oct. 12, 2010.
First Office Action for China Patent Application No. 200880121407.2, dated Aug. 24, 2011.
Final Office action issued in U.S. Appl. No. 11/966,447 mailed Jan. 5, 2011.
Supplementary European Search Report issued in EP Application No. 08789242 mailed Dec. 17, 2010.
Takehi Moriguchi, et al. "Metal-modified silica adsorbents for removal of humic substances in water." Journal of Colloid and Interface Science 283, 2005 300-310, See Abstract, pp. 301 and 304.
International Search Report and Written Opinion regarding PCT/IB2009/055090, dated Jul. 16, 2010.
International Search Report and Written Opinion regarding PCT/IB2009/055092, dated Jul. 16, 2010.
Kuo et al., "Nano-particles dispersion effect on Ni/Al2O3 Composite Coatings," Materials Chemistry and Physics, 86: 5-10 (2004).
Sivakumar et al., "Preparation of nanosized TiO2 supported on activated alumina by a sonochemical method: observation of an increased photocatalytic decolourisation efficiency," Research on Chemical Intermediates, 30(7-8): 785-792 (2004).
Non-final Office action issued in related U.S. Appl. No. 11/530,210 on Jun. 28, 2010.
Non-final Office action issued in related U.S. Appl. No. 11/530,210 on Dec. 1, 2010.
Final Office action issued in related U.S. Appl. No. 11/777,140 Dec. 1, 2010.
Non-final Office Action submitted U.S. Appl. No. 12/704,058 dated Dec. 9, 2010.
Non-final Office Action submitted in U.S. Appl. No. 11/530,183 dated Oct. 13, 2010.
Compton R G et al., "Electrode Processes at the Surfaces of Sonotrodes," Electrochimica ACTA, vol. 41, No. 2, pp. 315-320 (Feb. 1, 1996).
Extended European Search Report received in EP Patent Application No. 08789246.9 mailed Nov. 30, 2011.
Final Office Action issued in U.S. Appl. No. 11/966,458, dated Mar. 17, 2011.
Final Office Action issued in U.S. Appl. No. 11/530,183, dated Mar. 22, 2011.
Non-Final Office Action issued in U.S. Appl. No. 111966,472, dated Mar. 31, 2011.
Final Office Action issued in U.S. Appl. No. 12/335,231, dated Mar. 31, 2011.
Barbaglia et al., "Search of Fusion Reactions During the Cavitation of a Single Bubble in Deuterated Liquids," Physica Scripta 72, pp. 75-78 (2005).
Non-final Office Action issued in U.S. Appl. No. 11/777,151 mailed Dec. 8, 2010.
Final Office Action issued in U.S. Appl. No. 11/966,418 mailed Jan. 12, 2011.
Extended European Search Report received in EP Patent Application No. 08789248.5 dated Nov. 30, 2011.
EP Office Action for Patent Application No. 08 789 248.5-2104 dated Sep. 4, 2012; 4 pages.
Chinese First Office Action for Patent Application No. 200880123174.X dated Sep. 20, 2012; 8 pages.
Chinese First Office Action for Patent Application No. 200880123172.0 dated Oct. 10, 2012; 9 pages.
EP Office Action for Patent Application No. 08 789 246.9-2104 dated Sep. 4, 2012; 4 pages.
Extended European Search Report received in EP Patent Application No. 08868425 dated Feb. 14, 2012.
Chinese First Office Action for Patent Application No. 200880123165.0 dated Oct. 10, 2012; 9 pages.
Non-final Office action issued for U.S. Appl. No. 12/335,176 (Jun. 6, 2013).

\* cited by examiner

PROCESS FOR APPLYING ONE OR MORE TREATMENT AGENTS TO A TEXTILE WEB

FIELD OF THE INVENTION

This invention relates generally to processes for treating textile webs to apply one or more treatment agents to such a web, and more particularly to a process for treating a textile web in which both ultrasonic energy and microwave energy are used to facilitate such a process.

BACKGROUND

The application of treatment agents to a textile web is commonly achieved in one of two manners, one being immersing the textile web into a bath of the treatment agent so that the dye soaks into the textile web and the second being applying treatment agent (which may be a liquid or a particulate treatment agent) to one or both faces of the textile web. Immersion (also commonly referred to as a dip-coating process) of the textile web requires a substantial amount of treatment solution to be used to saturate the textile web. In addition, following saturation the textile web must be washed to remove a substantial amount of unbound treatment agent from the web. While dip-coating results in good penetration of the treatment agent throughout the entire textile web, it presents a relatively inefficient use of the treatment solution and requires considerable post-processing of the web.

Treatment agent may instead be applied (such as by spraying or coating) to one or both faces of the textile web by any number of application techniques including, without limitation, ink jet systems, spray systems, gravure roll, slot die, rod coater, rotary screen curtain coater, air knife, brush and the like. Following the application of a treatment agent to the web, the web is often heated and/or steamed to promote binding of the treatment agent to the textile web. The textile web is then washed, such as in a bath of water or other cleaning solution, to remove unbound and excess treatment agent from the web.

Applying a treatment agent to the textile web in this manner (e.g., as opposed to dip-coating) requires considerably less treatment agent to be initially applied to the web, and thus reduces the time spent heating/steaming the web to facilitate binding of the treatment agent to the web, and also reduces the amount of unbound treatment agent that needs to be subsequently washed from the web. Such treatment operations where the agent is applied to only one face of the textile generally use less treatment agent, but run the associated risk that the treatment agent does not adequately penetrate into and through the web to the opposite face to provide even or uniform treatment of the web. While applying treatment agent to both faces of the textile web somewhat reduces this risk it also requires additional treatment agent to be used, resulting in more unbound treatment agent that must be subsequently removed from the web.

In particular applications, such as where the web is to be used as a filter medium, it is known to apply (e.g., by printing) one or more treatment agents to the surface, or face of the web to impart specific properties or characteristics to the filter medium, such as odor control, anti-microbial, and the like. The treatment agent is simply allowed to wick into the web without much uniformity. As a result, the desired characteristic is non-uniformly present in the web. Where more than one treatment agent is desired, it is difficult to apply a second treatment agent without coating or otherwise inhibiting the first treatment agent.

There is a need, therefore, for a process that reduces the amount of treatment agent that needs to be used in treating a textile web and facilitates improved penetration of one or more treatment agents into and through the web.

SUMMARY

In one aspect, a process for treating a textile web generally comprises applying a first treatment agent to the textile web. The web is moved with the first treatment agent applied thereto in an open configuration thereof over a contact surface of an ultrasonic vibration system with the textile web in direct contact with the contact surface of the ultrasonic vibration system. The ultrasonic vibration system is operated to impart ultrasonic energy to the textile web to facilitate the distribution of the first treatment agent through a first extent of the thickness of the textile web. A second treatment agent is applied to the textile web other than by saturating the textile web with the second treatment agent. The web is moved with the second treatment agent applied thereto in an open configuration thereof over a contact surface of an ultrasonic vibration system with the textile web in direct contact with the contact surface of the ultrasonic vibration system. The ultrasonic vibration system is operated to impart ultrasonic energy to the textile web to facilitate the distribution of the second treatment agent through a second extent of the thickness of the web. The second extent is different than the first extent.

In another aspect, a process for treating a textile web generally comprises applying a first treatment agent to the textile web. The web is moved with the first treatment agent applied thereto in an open configuration thereof in a longitudinal direction of the web over a contact surface of an ultrasonic vibration system with the textile web in direct contact with the contact surface of the ultrasonic vibration system. The ultrasonic vibration system is operated to impart ultrasonic energy to the textile web to facilitate the distribution of the first treatment agent within the textile web. A second treatment agent is applied to the first face of the textile web. The web is moved with the second treatment agent applied thereto in an open configuration thereof in a longitudinal direction of the web over a contact surface of an ultrasonic vibration system with the textile web in direct contact with the contact surface of the ultrasonic vibration system. The ultrasonic vibration system is operated to impart ultrasonic energy to the textile web to facilitate distribution of the second treatment agent within the web from the first of the textile web toward the second face thereof. The distribution is non-uniform distribution across a transverse direction of the web.

In yet another aspect, a process for treating a fibrous non-woven web generally comprises applying a solvent to the non-woven web to substantially soften the fibers of the web. The web is moved with the solvent applied thereto in an open configuration of the web in a longitudinal direction thereof over a contact surface of an ultrasonic vibration system with the web in direct contact with the contact surface of the ultrasonic vibration system. The ultrasonic vibration system is operated to impart ultrasonic energy to the web to facilitate fracturing of the fibers of the web.

BRIEF DESCRIPTION OF THE DRAWINGS

Corresponding reference characters indicate corresponding parts throughout the drawings.

DETAILED DESCRIPTION

Figure 1:
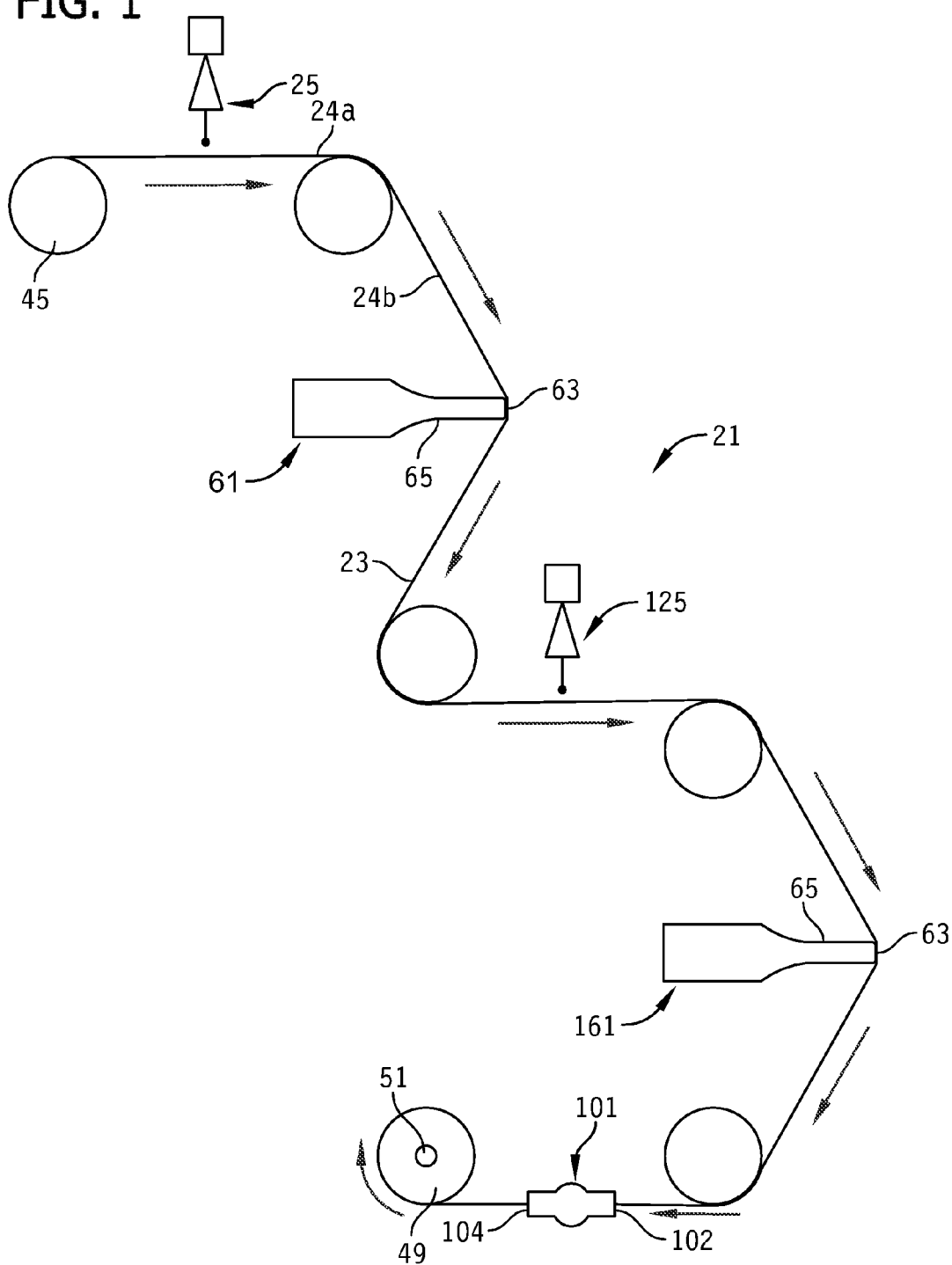
FIG. 1 is a schematic of apparatus for treating a textile web according to one embodiment of a process for applying multiple treatment agents to a textile web.

With reference now to the drawings and in particular to FIG. 1, one embodiment of apparatus for use in treating a textile web 23 is generally designated 21. In one suitable embodiment, the textile web 23 to be processed by the apparatus 21 comprises a non-woven fibrous web such as, without limitation, bonded-carded webs, spunbond webs and meltblown webs, polyesters, polyolefins, cotton, nylon, silks, hydroknit, coform, nanofiber, fluff batting, foam, elastomerics, rubber, film laminates, combinations of these materials or other suitable materials. The textile web 23 may be a single web layer or a multilayer laminate in which one or more layers of the laminate are suitable for treatment by a treatment agent. Alternatively, the textile web 23 may comprise a woven web and remain within the scope of this invention.

The term "spunbond" refers herein to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 20 microns.

The term "meltblown" refers herein to fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin et al. Meltblown fibers are microfibers which may be continuous or discontinuous, are generally smaller than 10 microns in average diameter, and are generally tacky when deposited onto a collecting surface.

Laminates of spunbond and meltblown fibers may be made, for example, by sequentially depositing onto a moving forming belt first a spunbond web layer, then a meltblown web layer and last another spunbond web layer and then bonding the layers together. Alternatively, the web layers may be made individually, collected in rolls, and combined in a separate bonding step. Such laminates usually have a basis weight of from about 0.1 to 12 osy (6 to 400 gsm), or more particularly from about 0.75 to about 3 osy.

More suitably, the textile web 23 is sufficiently open or porous so that treatment agents applied to the web may migrate throughout the thickness of the web. The "porosity" of the textile web 23 is a measurement of the void space within the textile and is measured for a particular web specimen in the following manner. For a given length (in centimeters) and width (in centimeters) of a web specimen (e.g., over which the web is generally homogeneous and, as such, has a uniform specific gravity), the specimen is weighed (in grams) by a suitable balance and the thickness (in centimeters) is measured using a suitable device, such as a VIR Electronic Thickness Tester, Model Number 89-1-AB commercially available from Thwing-Albert Instrument Company of Philadelphia, Pa., U.S.A. A total volume (in cubic centimeters) of the web specimen is determined as length×width×thickness. A material volume (in cubic centimeters) of the web specimen (i.e., the volume taken up just by the material in the web specimen) is determined as the weight of the web specimen divided by the specific gravity (in grams/cubic centimeter) of the material from which the web is constructed. The porosity (in percent) of the web specimen is then determined as ((total volume−material volume)/total volume)×100.

In particularly suitable embodiments, the textile web 23 has a porosity of at least about 10 percent, and more suitably at least about 20 percent. In other embodiments the porosity as determined by the Porosity Test may be at least about 50 and in others the porosity may be at least about 75. More suitably, the porosity is in the range of about 10 percent to about 90 percent, and more suitably in the range of about 20 percent to about 90 percent.

In more suitable embodiments, the textile web 23 is constructed for use as a filter medium, and more particularly a high performance filter medium comprising a lofty non-woven fibrous web that is highly porous. The lofty filter medium suitably has a density between about 0.005 g/cm$^3$ and about 0.1 g/cm$^3$, more suitably between about 0.01 g/cm$^3$ and about 0.09 g/cm$^3$ and even more suitably between about 0.02 g/cm$^3$ and about 0.08 g/cm$^3$. The basis weight of the filter medium ranges from about 0.25 to about 15 ounces per square yard (osy), more suitably from about 0.4 to about 14 osy, and even more suitably from about 0.5 to about 13 osy.

Fibers suitable for such a filter medium include crimped spunbond fibers and crimped staple fibers, and these fibers can be monocomponent fibers or multicomponent conjugate fibers. Suitable spunbond fibers and staple fibers have an average diameter of about 10 μm to about 50 μm. Of these crimped fibers, particularly suitable fibers are multicomponent conjugate fibers that contain two or more component polymers, and even more suitable fibers are multicomponent conjugate fibers containing polymers of different melting points. For example, the melting point difference between the highest melting polymer and the lowest melting polymer of the conjugate fibers is suitably at least about 5 degrees C., and more suitably about 30 degrees C., so that the lowest melting polymer can be melted without affecting the chemical and physical integrities of the highest melting polymer.

Generally, staple fibers, including monocomponent and conjugate staple fibers, are carded using a conventional carding process, e.g., a woolen or cotton carding process, or air laid to form unbonded nonwoven fiber webs; and spunbond fibers are formed into unbonded spunbond fiber webs by directly depositing spun fibers onto a forming surface. As is known in the art, monocomponent staple fibers and conjugate staple fibers can be mechanically crimped by passing fully formed fibers through, for example, a stuffer box or gear crimper, and conjugate staple fibers can be crimped by drawing or stretching fully formed fibers before the fibers are cut to staple lengths. Fibers may also be crimped during spinning.

Crimps on monocomponent fibers and conjugate fibers, including spunbond and staple fibers, can be imparted through asymmetric cooling across the cross-section of the fibers, generating solidification gradients within the cross-section, which leads to the formation of crimps, particularly helical crimps. Crimps on conjugate fibers, including spunbond fibers and staple fibers, composed of two or more component polymers that have different crystallization and/or solidification properties can be crimped during the solidification stage of the fiber spinning process, during which the differences in the component polymers create crystallization and/or solidification gradients that cause crimps on the fibers. Further, the differences in crystallization and/or solidification properties, which make the component polymers of the formed fibers to have different heat shrinkages, can be utilized to impart or additionally impart crimps on the fully formed conjugate fibers. Upon exposure to an appropriate heat treatment, the component polymers, having different heat shrinkages, cause crimps on the fibers. Such activation of "latent crimp" can be directed after conjugate fibers are formed into a web, or on the fibers prior to the web formation. The activation of latent crimps on the fibers prior to the web formation is more desirable since this process produces more uniform and dimensionally stable webs.

Unbonded conjugate fiber webs, including conjugate staple fiber webs and conjugate spunbond webs, can be bonded using a conventional bonding process that does not significantly compact the webs. Such processes include through-air bonding, powder adhesive bonding, liquid adhesive bonding, ultrasonic bonding, needling and hydroentangling. These bonding processes are conventional and well known in the art. Among these bonding processes, through-air bonding processes are particularly suitable for the present invention since the bonding processes bond the conjugate fiber webs without applying any substantial compacting pressure and, thus, produce lofty, uncompacted filter media. Through-air bonding processes are further discussed below. Similarly, the nonwoven webs of monocomponent fibers, including staple fiber webs and spunbond fiber webs, can be bonded with the above-disclosed bonding processes other than through-air bonding processes. Through-air bonding processes are not particularly suitable for monocomponent fiber webs unless the processes are used in conjunction with powder adhesive bonding or fluid adhesive bonding processes since through-air bonding processes, which need to melt the web fibers to effect bonds, produce flattened webs having a non-uniform loft.

One particularly suitable filter medium is a through-air bonded non-woven web fabricated from crimped multicomponent conjugate fibers, and more particularly suitable conjugate fibers are spunbond conjugate fibers. For illustration purposes, suitable fibers for a high performance filter medium are bicomponent spunbond conjugate fibers (hereinafter referred to as bicomponent fibers) and bicomponent fiber webs, and to a through-air bonding process although other spunbond or staple conjugate fibers of more than two polymers and other bonding processes can be utilized for the present invention, as discussed above.

These bicomponent fibers have the low melting component polymer at least partially exposed to the surface along the entire length of the fibers. Suitable configurations for the bicomponent fibers include side-by-side configurations and sheath-core configurations, and suitable sheath-core configurations include eccentric sheath-core and concentric sheath-core configurations. Of these sheath-core configurations, eccentric sheath-core configurations are particularly useful since imparting crimps on eccentric sheath-core bicomponent fibers can be effected more easily. If a sheath-core configuration is employed, it is highly desired to have the low melting polymer form the sheath.

A wide variety of combinations of thermoplastic polymers known to form fibers and/or filaments can be employed to produce the conjugate fibers provided that the selected polymers have sufficiently different melting points and, suitably, different crystallization and/or solidification properties. The melting point differences between the selected polymers facilitate the through-air bonding process, and the differences in the crystallization and solidification properties promote fiber crimping, especially crimping through heat activation of latent crimps. Suitable polymers for the present invention include, but are not limited to, polyolefins, e.g., polyethylene, polypropylene, polybutylene and the like; polyamides, e.g., nylon 6, nylon 6/6, nylon 10, nylon 12 and the like; polyesters, e.g., polyethylene terephthalate, polybutylene terephthalate and the like; polycarbonate; polystyrene; thermoplastic elastomers; vinyl polymers; polyurethane; and blends and copolymers thereof. Particularly suitable polymers are polyolefins, including polyethylene, e.g., linear low density polyethylene, low density polyethylene, medium density polyethylene, high density polyethylene and blends thereof; polypropylene; polybutylene; and copolymers as well as blends thereof.

Additionally, the suitable fiber forming polymers may have thermoplastic elastomers blended therein. Of these suitable polymers, particularly suitable polymers for the high melting component include polypropylene and copolymers of polypropylene and ethylene, and particularly suitable polymers for the low melting component include polyethylenes, more particularly linear low density polyethylene and high density polyethylene. In addition, the low melting component may contain additives for enhancing the crimpability and/or lowering the bonding temperature of the fibers, and enhancing the abrasion resistance, strength and softness of the resulting webs. For example, the low melting polymer component may contain about 5 to about 20% by weight of a thermoplastic elastomer such as an ABA' block copolymer of styrene, ethylene-butylene and styrene. Such copolymers are commercially available and some of which are identified in U.S. Pat. No. 4,663,220 to Wisneski et al. An example of highly suitable elastomeric block copolymers is KRATON G-2740. Another group of suitable additive polymers is ethylene alkyl acrylate copolymers, such as ethylene butyl acrylate, ethylene methyl acrylate and ethylene ethyl acrylate, and the suitable amount to produce the desired properties is from about 2 wt % to about 50 wt %, based on the total weight of the low melting polymer component. Yet other suitable additive polymers include polybutylene copolymers and ethylene-propylene copolymers. The bicomponent fibers have from about 20% to about 80%, preferably from about 40% to about 60%, by weight of the low melting polymer and from about 80% to about 20%, preferably about 60% to about 40%, by weight of the high melting polymer.

Additional examples of suitable non-woven fiber webs 23 for use as a filter medium are described U.S. Pat. No. 6,169,045 (Pike et al.), issued Jan. 2, 2001, the entire disclosure of which is incorporated herein by reference.

The web treating apparatus 21 in the illustrated embodiment of FIG. 1 suitably comprises a first applying device, schematically and generally indicated at 25, operable to apply a first treatment agent to at least one of the faces 24a, 24b of the textile web 23. For example, in the embodiment illustrated in FIG. 1, this first applying device 25 is particularly operable to apply a first treatment agent to only one face 24a of the textile web 23. It is understood, however, that the applying device 25 may be operable to apply a first treatment agent only to the opposite face 24b of the textile web 23, or to both faces of the web. It is also contemplated that more than one applying device 25 may be used (e.g., one corresponding to each face 24a, 24b of the textile web 23) to apply a first treatment agent to both faces of the textile web either concurrently or sequentially.

The term "treatment agent" as used herein refers to a liquid or particulate agent that imparts some characteristic to the textile web upon being added to the web, or causes (through a change in the properties of the treatment agent or a change in the web after reacting in some manner with the treatment agent) some characteristic to be imparted to the textile web 23 either at the time of application, upon further processing of the web, or sometime after treatment of the web is completed. Examples of suitable treatment agents include, without limitation, fragrance agents, anti-microbial agents, anti-viral agents, odor control agents, UV protection, gas phase/VOC eliminators such as active carbon, $TiO_2$, metal (e.g., copper and iron) modified silica nanoparticles, coatings that have alumina and silica nanoparticles.

In other embodiments, the treatment agent 23 may comprise a solvent to soften the fibers of the textile web 23 upon application thereto and for use in fracturing the fibers in a manner described later herein. Examples of suitable solvents that will cause "softening" of polyolefins (polyethylene and polypropylene) include, without limitation, aromatic hydrocarbons such as toluene and xylene, and chlorinated solvents such as trichloroethane and trichlorobenzene. Examples of suitable solvents and softening agents that will cause "softening" of polyesters include, without limitation, strong alkalies in water (potassium hydroxide, sodium hydroxide), alkalies in ethanol (0.3% sodium hydroxide in ethanol), mixtures of phenol with trichloromethane, dimethylformamide, and benzyl alcohol.

In a particularly suitable embodiment, the treatment agent is of a composition that provides an enhanced absorption of microwave energy, such as by having a relatively high dielectric loss factor. As used herein, the "dielectric loss factor" is a measure of the receptivity of a material to high-frequency energy. The measured value of $\in'$ is most often referred to as the dielectric constant, while the measured value of $\in''$ is denoted as the dielectric loss factor. These values can be measured directly using any suitable measurement devices, such as a Network Analyzer with a low power, external electric field (i.e., 0 dBm to +5 dBm) typically over a frequency range of 300 KHz to 3 GHz, although Network Analyzers to 20 GHz are readily available. Most commonly dielectric loss factor is measured at a frequency of either 915 MHz or 2,450 MHz (and at room temperature, such as about 25 degrees Celsius). For example, one suitable measuring system can include an HP8720D Dielectric Probe, and a model HP8714C Network Analyzer, both available from Agilent Technologies of Brookfield, Wis., U.S.A. Substantially equivalent devices may also be employed. By definition $\in''$ is always positive, and a value of less than zero is occasionally observed when $\in''$ is near zero due to the measurement error of the analyzer.

In one particularly suitable embodiment, the treatment agent has a dielectric loss factor at 915 MHz and 25 degrees Celsius of at least about 10, more suitably at least about 50, and even more suitably at least about 100. For comparison purposes, the dielectric loss factor of water under the same conditions is about 1.2. In another suitable embodiment, the treatment agent has a dielectric loss factor at 2,450 MHz and 25 degrees Celsius of at least about 25, more suitably at least about 50, and even more suitably at least about 100. Water has a dielectric loss factor of about 12 under these same conditions.

As an example, the treatment agent may include additives or other materials to enhance the affinity of the dye to microwave energy. Examples of such additives and materials include, without limitation, various mixed valent oxides, such as magnetite, nickel oxide and the like; carbon, carbon black and graphite; sulfide semiconductors, such as $FeS_2$ and $CuFeS_2$; silicon carbide; various metal powders such as powders of aluminum, iron and the like; various hydrated salts and other salts, such as calcium chloride dihydrate; diatomaceous earth; aliphatic polyesters (e.g., polybutylene succinate and poly(butylene succinate-co-adipate), polymers and copolymers of polylactic acid and polyethylene glycols; various hygroscopic or water absorbing materials or more generally polymers or copolymers with many sites of —OH groups.

Examples of other suitable inorganic microwave absorbers include, without limitation, aluminum hydroxide, zinc oxide, barium titanate. Examples of other suitable organic microwave absorbers include, without limitation, polymers containing ester, aldehyde ketone, isocyanate, phenol, nitrile, carboxyl, vinylidene chloride, ethylene oxide, methylene oxide, epoxy, amine groups, polypyrroles, polyanilines, polyalkylthiophenes. Mixtures of the above are also suitable for use in the treatment agent to be applied to the textile web. The selective additive or material may be ionic or dipolar, such that the applied energy field can activate the molecule.

The applicating device 25 according to one embodiment may comprise any suitable device used for applying liquids to textile webs 23 other than by saturating the entire web (e.g., by immersing the textile web in a bath of treatment agent solution to saturate the web), whether the treatment agent is pre-metered (e.g., in which little or no excess treatment agent is applied to the web upon initial application thereof) or post-metered (i.e., an excess amount of treatment agent is applied to the textile web and subsequently removed).

Examples of suitable pre-metered applicating devices 25 for applying liquid treatment agents to the textile web include, without limitation, devices for carrying out the following known application techniques:

Slot die: The treatment agent is metered through a slot in a printing head directly onto the textile web 23.

Direct gravure: The treatment agent is in small cells in a gravure roll. The textile web 23 comes into direct contact with the gravure roll and the treatment agent in the cells is transferred onto the textile web.

Offset gravure with reverse roll transfer: Similar to the direct gravure technique except the gravure roll transfers the coating material to a second roll. This second roll then comes into contact with the textile web 23 to transfer the treatment agent onto the textile web.

Curtain coating: This is a coating head with multiple slots in it. Liquid treatment agent is metered through these slots and drops a given distance down onto the textile web 23.

Slide (Cascade) coating: A technique similar to curtain coating except the multiple layers of treatment agent come into direct contact with the textile web 23 upon exiting the coating head. There is no open gap between the coating head and the textile web 23.

Forward and reverse roll coating (also known as transfer roll coating): This consists of a stack of rolls which transfers the treatment agent from one roll to the next for metering purposes. The final roll comes into contact with the textile web 23. The moving direction of the textile web 23 and the rotation of the final roll determine whether the process is a forward process or a reverse process.

Extrusion coating: This technique is similar to the slot die technique except that the treatment agent is a solid at room temperature. The treatment agent is heated to melting temperature in the print head and metered as a liquid through the slot directly onto the textile web 23. Upon cooling, the treatment agent becomes a solid again.

Rotary screen: The treatment agent is pumped into a roll which has a screen surface. A blade inside the roll forces the treatment agent out through the screen for transfer onto the textile.

Spray nozzle application: The treatment agent is forced through a spray nozzle directly onto the textile web 23. The desired amount (pre-metered) of treatment agent can be applied, or the textile web 23 may be saturated by the spraying nozzle and then the excess treatment agent can be squeezed out (post-metered) by passing the textile web through a nip roller.

Flexographic printing: The treatment agent is transferred onto a raised patterned surface of a roll. This patterned roll then contacts the textile web 23 to transfer the treatment agent onto the textile web.

Digital textile printing: The treatment agent is loaded in an ink jet cartridge and jetted onto the textile web 23 as the textile web passes under the ink jet head.

Examples of suitable post-metering applicating devices for applying the liquid treatment agent to the textile web 23 include without limitation devices that operate according to the following known applicating techniques:

Rod coating: The treatment agent is applied to the surface of the textile web 23 and excess treatment agent is removed by a rod. A Mayer rod is the prevalent device for metering off the excess treatment agent.

Air knife coating: The treatment agent is applied to the surface of the textile web 23 and excess treatment agent is removed by blowing it off using a stream of high pressure air.

Knife coating: The treatment agent is applied to the surface of the textile web 23 and excess treatment agent is removed by a head in the form of a knife.

Blade coating: The treatment agent is applied to the surface of the textile web 23 and excess treatment agent is removed by a head in the form of a flat blade.

Spin coating: The textile web 23 is rotated at high speed and excess treatment agent applied to the rotating textile web spins off the surface of the web.

Fountain coating: The treatment agent is applied to the textile web 23 by a flooded fountain head and excess treatment agent is removed by a blade.

Brush application: The treatment agent is applied to the textile web 23 by a brush and excess treatment agent is regulated by the movement of the brush across the surface of the web.

It is contemplated that the first treatment agent applied to the textile web 23 by the applicating device 25 may comprise a particulate treatment agent instead of a liquid treatment agent, or a liquid-particulate mixture, without departing from the scope of this invention.

Following application of the first treatment agent to the textile web 23, the textile web is suitably delivered to an ultrasonic vibration system, generally indicated at 61, having a contact surface 63 (FIG. 2) over which the treated web 23 passes in contact with the vibration system such that the vibration system imparts ultrasonic energy to the web. In the illustrated embodiment, the ultrasonic vibration system 61 has a terminal end 65, at least a portion of which defines the contact surface 63 contacted by the textile web 23

Figure 2:
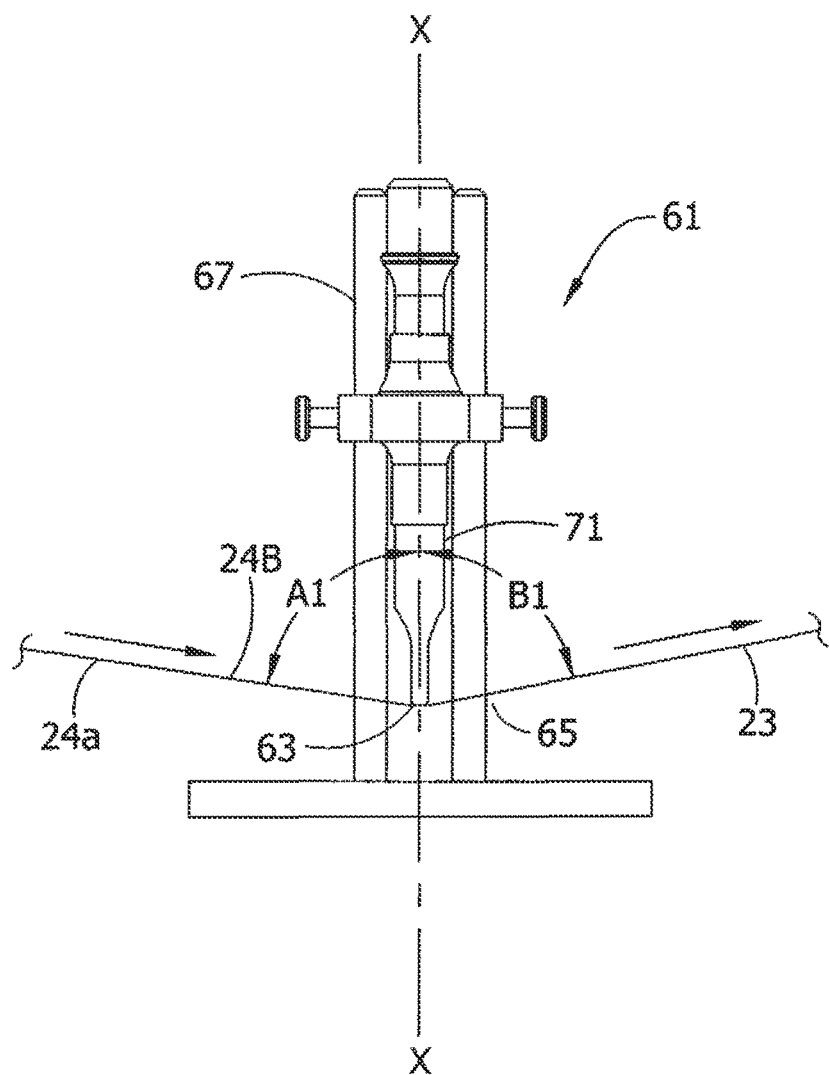
FIG. 2 is a side elevation of an ultrasonic vibration system and support frame of the apparatus of FIG. 1.

In one particularly suitable embodiment, the textile web 23 is in the form of a generally continuous web, and more particularly a rolled web wherein the web is unrolled during processing and then rolled up following processing for transport to other post-processing stations. For example, as illustrated in FIGS. 1 and 2, the ultrasonic vibration system 61 may be suitably mounted on a support frame 67 (FIG. 2) intermediate an unwind roll 45 and a wind roll 49 (the unwind roll and wind roll also being mounted on suitable respective support frames (not shown)). It is understood, however, that the textile web 23 may alternatively be in the form of one or more discrete webs during treatment without departing from the scope of this invention. The applicating device 25 is located between the unwind roll 45 and the ultrasonic vibration system to apply the first treatment agent to the one face 24a of the textile web before the web advances to the vibration system. It is understood, however, that the first treatment agent may be applied to the textile web 23 other than immediately upstream of the ultrasonic vibration system, such as at a station that is entirely separate from that at which the web is ultrasonically treated, without departing from the scope of this invention.

The textile web 23 is suitably advanced (i.e., moved), such as by a suitable drive mechanism 51 (FIG. 1) at the wind roll 49, in a machine direction (indicated by the direction arrows in FIGS. 1 and 2) from the unwind roll past the applicating device 25 and the ultrasonic vibration system 61 to the wind roll. The term "machine direction" or "longitudinal direction" as used herein refers generally to the direction in which the textile web 23 is moved (e.g., longitudinally of the web in the illustrated embodiment) during processing. The term "cross-machine direction" or "transverse direction" is used herein to refer to the direction normal to the machine direction of the textile web 23 and generally in the plane of the web (e.g., widthwise of the web in the illustrated embodiment). With particular reference to FIG. 2, the textile web 23 suitably advances toward the contact surface 63 (e.g., at the terminal end 65 of the ultrasonic vibration system 61) at an approach angle A1 relative to a longitudinal axis X of the ultrasonic vibration system 61, and after passing over the contact surface the web further advances away from the contact surface at a departure angle B1 relative to the longitudinal axis X of the ultrasonic vibration system.

The approach angle A1 of the textile web 23, in one embodiment, is suitably in the range of about 1 to about 89 degrees, more suitably in the range of about 1 to about 45 degrees, and even more suitably in the range of about 10 to about 45 degrees. The departure angle B1 of the web 23 is suitably approximately equal to the approach angle A1 as illustrated in FIG. 2. However, it is understood that the departure angle B1 may be greater than or less than the approach angle A1 without departing from the scope of this invention.

In one particularly suitable embodiment, the ultrasonic vibration system 61 is adjustably mounted on the support frame 67 for movement relative to the support frame (e.g., vertically in the embodiment illustrated in FIG. 2) and the unwind and wind rolls 45, 49 to permit adjustment of the contact surface 63 of the ultrasonic vibration system relative to the web 23 to be treated. For example, the ultrasonic vibration system 61 is selectively positionable between a first position (not shown) at which the approach angle A1 and departure angle B1 of the web is substantially zero or at least relatively small, and a second position illustrated in FIGS. 1 and 2. In the first position of the vibration system 61, the contact surface 63 of the vibration system may but need not necessarily be in contact with the textile web 23.

In the second, or operating position of the ultrasonic vibration system 61, the terminal end 65 (and hence the contact surface 63) of the vibration system is substantially spaced from the first position and is in contact with the textile web 23. Movement of the vibration system 61 from its first position to its second position in this embodiment urges the web 23 to along with the contact surface 63 so as to form the approach and departure angles A1, B1 of the web.

Moving the ultrasonic vibration system 61 from its first position to its second position in this manner may also serve to tension, or increase the tension in, the textile web 23 at least along the segment of the web that lies against the contact surface 63 of the vibration system while the web is held between the unwind roll 45 and the wind roll 49. For example, in one embodiment the textile web 23 may be held in uniform tension along its width (i.e., its cross-machine direction dimension), at least at that segment of the web that is contacted by the contact surface 63 of the ultrasonic vibration system 61, in the range of about 0.025 pounds/inch of web width to about 3 pounds/inch of web width, and more suitably in the range of about 0.1 to about 1.25 pounds/inch of web width.

In one particularly suitable embodiment, the ultrasonic vibration system 61 is located relative to the textile web 23 so that the contact surface 63 of the vibration system contacts the face 24b of the web opposite the face 24a to which the dye was initially applied. While in the illustrated embodiment the first treatment agent is applied to the one face 24a of the textile web while the ultrasonic vibration system 61 contacts the opposite face 24b, it is understood that the treatment agent may instead be applied to the face 24b while the ultrasonic vibration system contacts the opposite face 24a.

Figure 3:
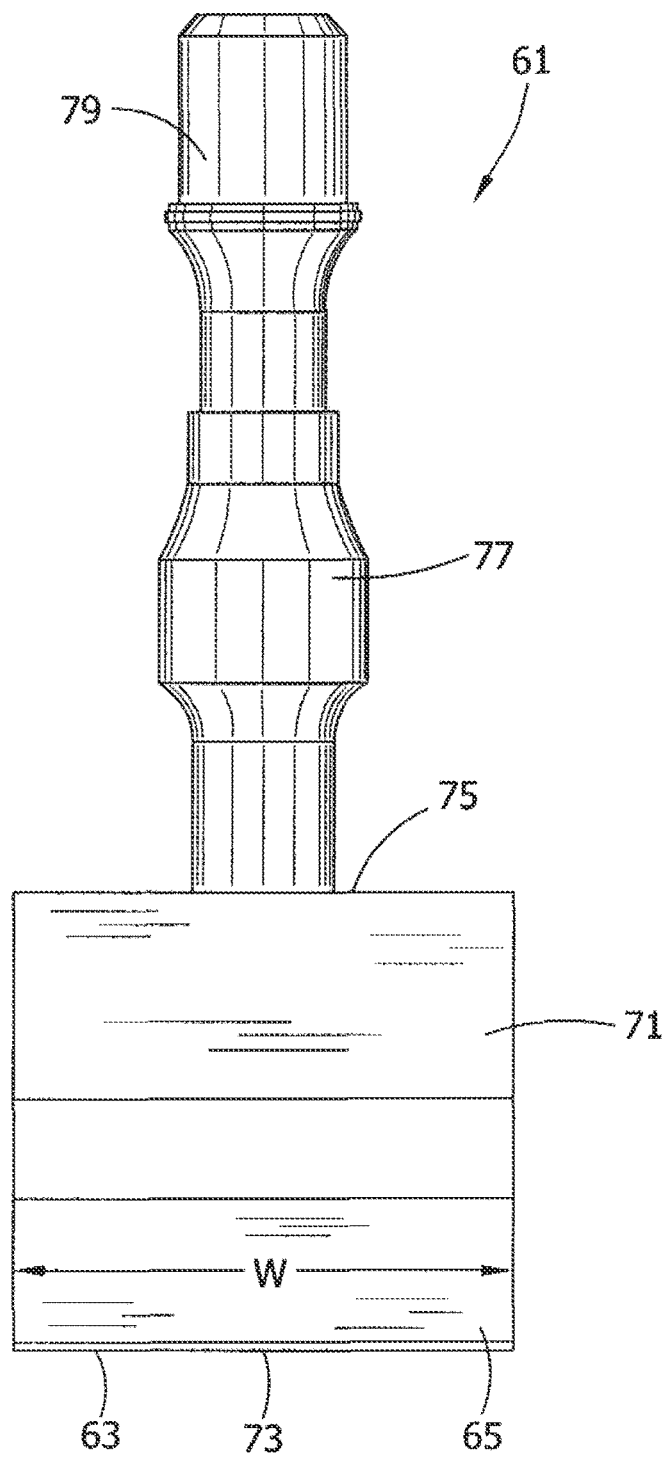
FIG. 3 is a front elevation of the ultrasonic vibration system of the apparatus of FIG. 1.

With particular reference now to FIG. 3, the ultrasonic vibration system 61 in one embodiment suitably comprises an ultrasonic horn, generally indicated at 71, having a terminal end 73 that in the illustrated embodiment defines the terminal end 65 of the vibration system, and more particularly defines the contact surface 63 of the vibration system. In particular, the ultrasonic horn 71 of FIG. 3 is suitably configured as what is referred to herein as an ultrasonic bar (also sometimes referred to as a blade horn) in which the terminal end 73 of the horn is generally elongate, e.g., along its width w. The ultrasonic horn 71 in one embodiment is suitably of unitary construction such that the contact surface 63 defined by the terminal end 73 of the horn is continuous across the entire width w of the horn.

Additionally, the terminal end 73 of the horn 71 is suitably configured so that the contact surface 63 defined by the terminal end of the ultrasonic horn is generally flat and rectangular. It is understood, however, that the horn 71 may be configured so that the contact surface 63 defined by the terminal end 73 of the horn is more rounded or other than flat without departing from the scope of this invention. The ultrasonic horn 71 is suitably oriented relative to the moving textile web 23 so that the terminal end 73 of the horn extends in the cross-machine direction across the width of the web. The width w of the horn 71, at least at its terminal end 73, is suitably sized approximately equal to and may even be greater than the width of the web. It is understood, however, that the width of the horn may be less than the width of the web. It is also contemplated that for relatively wide webs two are more horns may be arranged in side-by-side arrangement to extend across all or part of the web.

Figure 4:
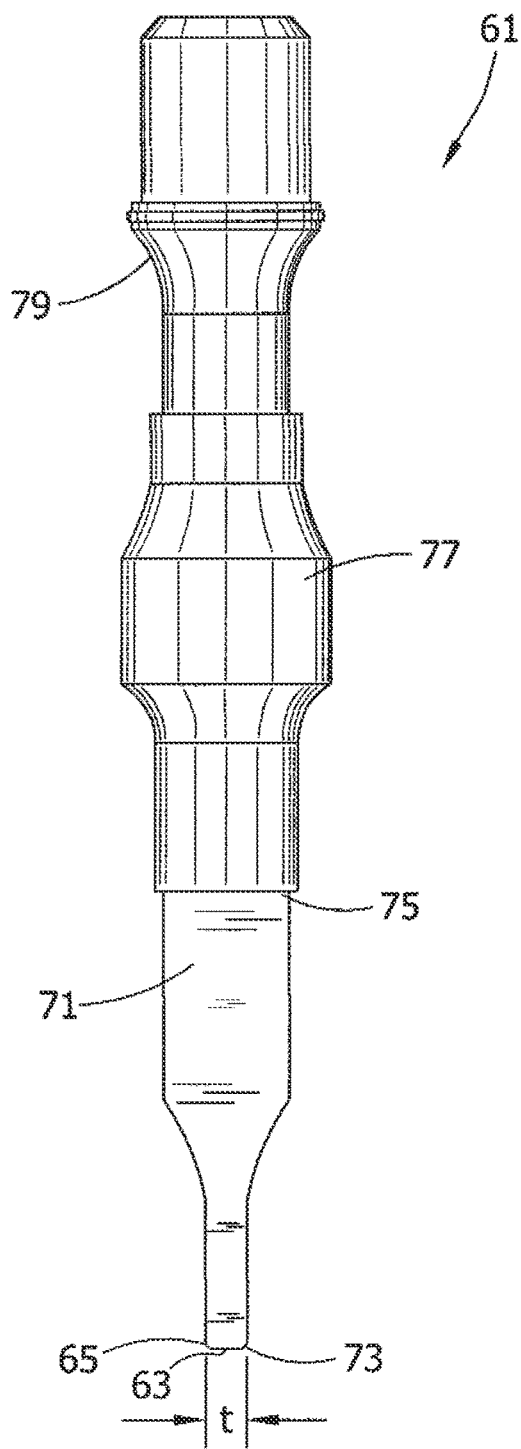
FIG. 4 is a side elevation thereof.

A thickness t (FIG. 4) of the ultrasonic horn 71 is suitably greater at a connection end 75 of the horn (i.e., the longitudinal end of the horn opposite the terminal end 73 thereof) than at the terminal end of the horn to facilitate increased vibratory displacement of the terminal end of the horn during ultrasonic vibration. As one example, the ultrasonic horn 71 of the illustrated embodiment of FIGS. 3 and 4 has a thickness t at its connection end 75 of approximately 1.5 inches (3.81 cm) while its thickness at the terminal end 73 is approximately 0.5 inches (1.27 cm). The illustrated horn 71 also has a width w of about 6.0 inches (15.24 cm) and a length (e.g., height in the illustrated embodiment) of about 5.5 inches (13.97 cm). The thickness t of the illustrated ultrasonic horn 71 tapers inward as the horn extends longitudinally toward the terminal end 73. It is understood, however, that the horn 71 may be configured other than as illustrated in FIGS. 3 and 4 and remain within the scope of this invention as long as the horn defines a contact surface 63 of the vibration system 61 suitable for contacting the textile web 23 to impart ultrasonic energy to the web.

The ultrasonic vibration system 61 of the illustrated embodiment is suitably in the form of what is commonly referred to as a stack, comprising the ultrasonic horn, a booster 77 coaxially aligned (e.g., longitudinally) with and connected at one end to the ultrasonic horn 71 at the connection end 75 of the horn, and a converter 79 (also sometimes referred to as a transducer) coaxially aligned with and connected to the opposite end of the booster. The converter 79 is in electrical communication with a power source or generator (not shown) to receive electrical energy from the power source and convert the electrical energy to high frequency mechanical vibration. For example, one suitable type of converter 79 relies on piezoelectric material to convert the electrical energy to mechanical vibration.

The booster 77 is configured to amplify (although it may instead be configured to reduce, if desired) the amplitude of the mechanical vibration imparted by the converter 79. The amplified vibration is then imparted to the ultrasonic horn 71. It is understood that the booster 77 may instead be omitted from the ultrasonic vibration system 61 without departing from the scope of this invention. Construction and operation of a suitable power source, converter 79 and booster 77 are known to those skilled in the art and need not be further described herein.

In one embodiment, the ultrasonic vibration system 61 is operable (e.g., by the power source) at a frequency in the range of about 15 kHz to about 100 kHz, more suitably in the range of about 15 kHz to about 60 kHz, and even more suitably in the range of about 20 kHz to about 40 kHz. The amplitude (e.g., displacement) of the horn 71, and more particularly the terminal end 73 thereof, upon ultrasonic vibration may be varied by adjusting the input power of the power source, with the amplitude generally increasing with increased input power. For example, in one suitable embodiment the input power is in the range of about 0.1 kW to about 4 kW, more suitably in the range of about 0.5 kW to about 2 kW and more suitably about 1 kW.

In operation according to one embodiment of a process for applying one or more treatment agents to a textile web, a rolled textile web 23 is initially unwound from the unwind roll 45, e.g., by the wind roll 49 and drive mechanism 51, with the web passing the first applicating device 25 and then the ultrasonic vibration system 61. The ultrasonic vibration system 61 is in its second position (as illustrated in FIGS. 1 and 2) with the terminal end 65 (and hence the contact surface 63) of the vibration system displaced along with the textile web to the desired approach and departure angles A1, B1 of the textile web. The textile web 23 may also be tensioned in the second position of the vibration system 61 and/or by further winding the wind roll 49, by back winding the unwind roll 45, by both, or by other suitable tensioning structure and/or techniques.

During processing between the unwind roll 45 and the wind roll 49, the textile web 23 is suitably configured in what is referred to herein as a generally open configuration as the web passes over the contact surface 63 of the ultrasonic vibration system 61. The term "open configuration" is intended to mean that the textile web 23 is generally flat or otherwise unfolded, ungathered and untwisted, at least at the segment of the web in contact with the contact surface 63 of the vibration system 61.

A feed rate of the web 23 (i.e., the rate at which the web moves in the machine direction over the contact surface 63 of the vibration system 61) and the width of the contact surface (i.e., the thickness t of the terminal end 73 of the horn 71 in the illustrated embodiment, or where the contact surface is not flat or planar, the total length of the contact surface from one side of the terminal end of the horn to the opposite side thereof) determine what is referred to herein as the dwell time of the web on the contact surface of the vibration system. It will be understood, then, that the term "dwell time" refers herein to the length of time that a segment of the textile web 23 is in contact with the contact surface 63 of the vibration system 61 as the web is drawn over the contact surface (e.g., the width of the contact surface divided by the feed rate of the web). In one suitable embodiment, the feed rate of the web 23 across the contact surface 63 of the vibration system 61 is in the range of about 0.5 feet/minute to about 2,000 feet/minute, more suitably in the range of about 1 feet/minute to about 100 feet/minute and even more suitably in the range of about 2 feet/minute to about 10 feet/minute. It is understood, however, that the feed rate may be other than as set forth above without departing from the scope of this invention.

In other embodiments, the dwell time is suitably in the range of about 0.1 seconds to about 60 seconds, more suitably in the range of about 1 second to about 10 seconds, and even more suitably in the range of about 2 seconds to about 5 seconds. It is understood, however, that the dwell time may be other than as set forth above depending for example on the material from which the web 23 is made, the treatment agent composition, the frequency and vibratory amplitude of the horn 71 of the vibration system 61 and/or other factors, without departing from the scope of this invention.

As the textile web 23 passes the first applicating device 25, the first treatment agent is applied to the one face 24a of the web. The ultrasonic vibration system 61 is operated by the power source to ultrasonically vibrate the ultrasonic horn 71 as the opposite face 24b of the textile web 23 is drawn over the contact surface 63 of the vibration system. The horn 71 imparts ultrasonic energy to the segment of the textile web 23 that is in contact with the contact surface 63 defined by the terminal end 73 of the horn. Imparting ultrasonic energy to the opposite face 24b of the textile web 23 in this manner facilitates a generally uniform migration of the first treatment agent from the one face 24a of the web into and through the web toward the opposite face 24b of the web.

It is understood, however, that the face 24a (i.e., the face on which the first treatment agent is applied) of the textile web 23 may oppose and contact the contact surface 63 of the vibration system 61 without departing from the scope of this invention. It is also contemplated that a second ultrasonic vibration system (not shown) may be used to apply ultrasonic energy to the face 24a of the web, either concurrently or sequentially with the first ultrasonic vibration system 61 applying ultrasonic energy to the opposite face 24b of the web following application of the first treatment agent.

In one suitable embodiment, the ultrasonic energy imparted to the textile web 23 by the ultrasonic vibration system 61 is sufficient to result in the first treatment agent migrating generally uniformly through the entire thickness of the textile web to the opposite face 24b of the web. It is understood, however, that the ultrasonic vibration system 61 may operate to result in the first treatment agent migrating generally uniformly through only a portion of the thickness toward the opposite face 24b of the web.

With reference now back to FIG. 1, following ultrasonic treatment of the treated textile web 23 to facilitate migration of the first treatment agent through the textile web, a second treatment agent is applied to the textile web by a suitable applicating device, schematically and generally indicated at 125, and more suitably a different applicating device than the device 25 used to apply the first treatment agent to the textile web. This applicating device 125 may be of any suitable type of applicating device such as those described previously as being suitable for use as the first applicating device. It may be of the same type of applicating device as the first applicating device, or it may be of a different type depending on the second treatment agent and the manner in which it is to be applied to the textile web.

In one suitable embodiment, the second treatment agent is different from the first treatment agent and may comprise either a liquid treatment agent or a particulate treatment agent. For example, the second treatment agent may comprise any of the treatment agents described previously herein as being suitable for use as the first treatment agent (but other than the same agent used as the first treatment agent). As one particularly suitable example, the first treatment agent may comprise an anti-microbial composition while the second treatment may comprise an odor control composition. In another suitable embodiment, the first and second treatment agents may generally of the same composition but with the first treatment agent being a liquid and the second treatment agent being a particulate, or both agents may be a liquid with the second treatment agent being of a different viscosity than the first treatment agent.

This second applicating device 125 is particularly operable to apply the second treatment agent to at least one of the faces 24a, 24b of the textile web 23. For example, in the embodiment illustrated in FIG. 1, the second applicating device 125 is operable to apply the second treatment agent treatment agent to only one face 24a of the textile web, and more suitably the same face 24a to which the first treatment agent was applied of the textile web. It is understood, however, that the applicating device 125 may be operable to apply a first treatment agent only to the opposite face 24b of the textile web 23, or to both faces of the web. It is also contemplated that more than one second applicating device may be used (e.g., one corresponding to each face 24a, 24b of the textile web 23) to apply the second treatment agent to both faces of the textile web either concurrently or sequentially.

Following application of the second treatment agent to the textile web 23, the textile web is suitably delivered to an ultrasonic vibration system, generally indicated at 161 in FIG. 1 at which ultrasonic energy is again applied to the web. While construction of this second ultrasonic vibration system 161 is not specifically shown in the drawings, it is understood that it may have substantially the same construction as the system 61 of FIG. 2. A such, the second ultrasonic vibration system 161 has (with reference to the system 61 of FIG. 2), having a contact surface 63 over which the treated web 23 passes in contact with the vibration system such that the vibration system imparts ultrasonic energy to the web. In the illustrated embodiment, the second ultrasonic vibration system 161 has a terminal end 65, at least a portion of which defines the contact surface 63 contacted by the textile web 23.

In the continuous textile web 23 processing embodiment illustrated in FIG. 1, the second applicating device 125 is suitably located in the machine (e.g., longitudinal) direction between the first ultrasonic vibration system 61 and the second ultrasonic vibration system 161 to apply the second treatment agent to the one face 24a of the textile web before the web advances to the second ultrasonic vibration system. It is understood, however, that the second treatment agent may be applied to the textile web 23 other than immediately upstream of the second ultrasonic vibration system 161, such as at a station that is entirely separate from that at which the web is ultrasonically treated, without departing from the scope of this invention. The textile web 23 is suitably advanced (i.e., moved), such as by the drive mechanism 51 (FIG. 1) at the wind roll 49, in the machine direction (indicated by the direction arrows in FIG. 1) from the first ultrasonic vibration system 61 past the second applicating device 125 and then the second ultrasonic vibration system 161.

With reference to FIG. 2, the textile web 23 suitably advances toward the contact surface 63 (e.g., at the terminal end 65 of the second ultrasonic vibration system 161 at an approach angle A1 relative to a longitudinal axis X of the ultrasonic vibration system 161, and after passing over the contact surface 63 the web further advances away from the contact surface at a departure angle B1 relative to the longitudinal axis X of the ultrasonic vibration system. The approach angle A1 and/or the departure angle B1 of the web as it approaches, passes over and departs the contact surface of the second ultrasonic vibration system 161 may be the same as that of the web as it approaches, passes over and departs the contact surface of the first ultrasonic vibration system 61, or it may be different therefrom within the scope of this invention.

As the textile web 23 passes the second ultrasonic vibration system 61, the vibration system is operated to impart ultrasonic energy to the segment of the web 23 that is in contact with the contact surface 63 defined by the terminal end 73 of the second ultrasonic vibration system. For example, in the illustrated embodiment the second applicating device 125 applies the second treatment agent to the one face 24a of the textile web 23 (i.e., the same face to which the first treatment agent was applied) and the ultrasonic horn 71 vibrates as the opposite face 24b of the textile web 23 is drawn over the contact surface 63 of the second ultrasonic vibration system. Imparting ultrasonic energy to the opposite face 24b of the textile web 23 in this manner facilitates a generally uniform migration of the second treatment agent from the one face 24a of the web into and through the web toward the opposite face 24b of the web.

It is understood, however, that the face 24a (i.e., the face on which the second treatment agent is applied) of the textile web 23 may oppose and contact the contact surface 63 of the second ultrasonic vibration system 161 without departing from the scope of this invention. It is also contemplated that a another second ultrasonic vibration system (not shown) may be used to apply ultrasonic energy to the face 24a of the web, either concurrently or sequentially with the one second ultrasonic vibration system applying ultrasonic energy to the opposite face 24b of the web following application of the second treatment agent.

In one particularly suitable embodiment, the ultrasonic energy imparted to the textile web 23 by the second ultrasonic vibration system 161 is sufficient to result in the second treatment agent migrating generally uniformly through a thickness (broadly, a second thickness) of the textile web that is less than the thickness (broadly, a first thickness) to which the first treatment agent migrated. In this manner, at least a portion of the thickness of the textile web 23 (e.g., the first thickness subtracted by the second thickness) comprises only the first treatment agent and at least another portion of the thickness of the web (the second thickness) comprises the second treatment agent coating or otherwise interspersed with the first treatment agent. For example, where the first treatment agent is caused to migrate through the entire thickness of the textile web 23 to the opposite face 24b thereof, the second treatment agent is caused upon application of ultrasonic energy to migrate less than the entire thickness through the web from the one face 24a toward the opposite face 24b of the textile web.

Where the first treatment agent is caused to migrate through substantially the entire thickness of the web, it is contemplated that the second treatment agent may be applied to either face 24a, 24b of the textile and caused by ultrasonic energy of the second ultrasonic vibration system 161 to migrate through less than the entire thickness of the web. It is further contemplated that where the first treatment agent is caused to migrate through substantially the entire thickness of the web the second treatment agent may be applied to both faces 24a, 24b of the textile web 23, either concurrently or sequentially, and then caused by ultrasonic energy imparted by the second ultrasonic vibration system to migrate inward from each of the web faces less than one-half of the web thickness so that a central layer of the web comprises only the first treatment agent while opposite outer layers of the web comprise the second treatment agent coating or otherwise interspersed with the first treatment agent.

In other suitable embodiments, the second treatment agent may be applied by the second applicating device 125 only to the face 24b of the textile web 23 opposite the face 24a to which the first treatment agent was applied. The second ultrasonic vibration system 161 imparts ultrasonic energy to the one face 24a of the textile web 23 to facilitate a generally uniform migration of the second treatment agent into and through the web from the face 24b toward the other face 24a. Depending on the thickness to which the first treatment agent was caused to migrate from the face 24a of the textile web 23 into and through the web toward the opposite face 24b, migration of the second treatment agent into and through the web a second thickness may result in either 1) the first and second treatment agents abutting each other within the web to define a first web layer having only the first treatment agent and a second web layer having only the second treatment agent; 2) the first and second treatment agents overlapping each other within the web to define an interior web layer in which the first treatment agent is coated by or otherwise interspersed with the second treatment agent; and 3) the first and second treatment agents are spaced from each other to define an interior web layer that is devoid of both the first and second treatment agents.

Migration of the second treatment to a desired or predetermined thickness into the web upon application of the ultrasonic energy by the second ultrasonic vibration system 161 may be suitably controlled in a number of ways. For example, in one embodiment the terminal end 73 of the ultrasonic horn 71 of the second ultrasonic vibration system 161 may be sized to have a thickness t that is different from the thickness of the terminal end of the horn 71 of the first ultrasonic vibration system so that the dwell time of a web segment moving over the contact surface of the second ultrasonic vibration system is different from that as the web moves over the contact surface of the first ultrasonic vibration system (assuming that the feed rate of the web is the same. Alternatively, or additionally, the feed rate at which the web 23 passes over the contact surface of the second ultrasonic vibration system 161 may be different from the feed rate at which the web passes over the contact surface of the first ultrasonic vibration system 61. In other embodiments, the viscosity of the second treatment agent may alternatively, or additionally, be adjusted to be different from that of the first treatment agent without departing from the scope of this invention.

Additionally, or alternatively, migration of the second treatment agent within the web may be controlled by changing the thermal conductivity of the second treatment agent relative to that of the first treatment agent. The greater the thermal conductivity of the treatment agent, the faster it will conduct heat generated from the ultrasonic horn. The viscosity of the treatment agent will thus decrease faster and therefore penetrate more quickly into the web than a treatment agent having a relatively lower thermal conductivity.

With reference still to FIG. 1, following ultrasonic treatment of the treated textile web 23, the textile web is further advanced to, and through, a microwave system, schematically and generally indicated at 101. The microwave system 101 is operable to direct high frequency, electromagnetic radiant energy, and more suitably microwave energy, to the treated textile web 23 to facilitate expedited and enhanced binding of the first treatment agent to the web. In one particularly suitable embodiment, for example, the microwave system 101 may employ energy having a frequency in the range of about 1 MHz to about 5,800 MHz, and more suitably in the range of about 900 MHz to about 5,800 MHz. In one embodiment the frequency is more suitably about 915 MHz. In another embodiment the frequency is more suitably about 2,450 MHz.

Figure 5:
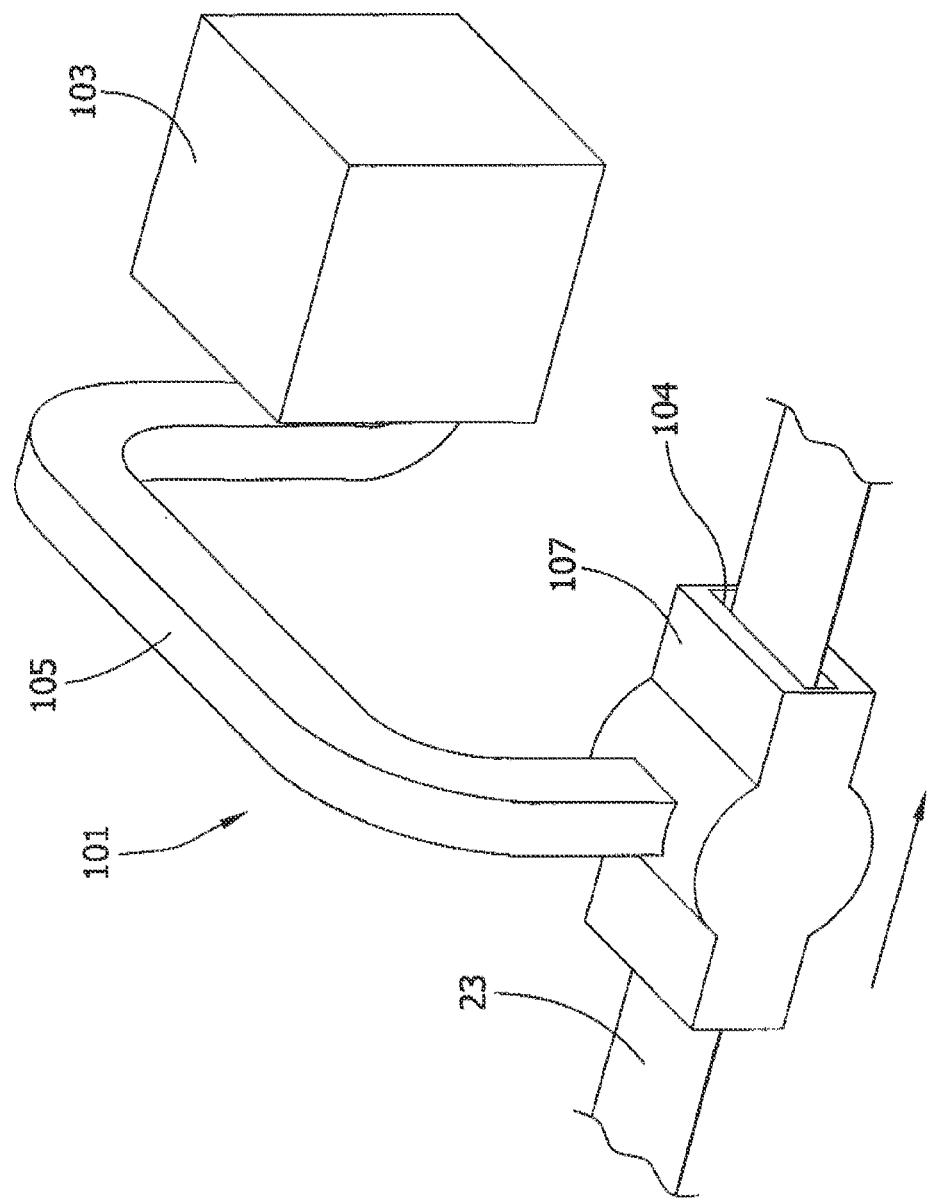
FIG. 5 is a perspective of one embodiment of a microwave system for use with the apparatus of FIG. 1.

The microwave system 101, with reference to FIG. 5, suitably comprises a microwave generator 103 operable to produce the desired amount of microwave energy, a wave-guide 105 and an application chamber 107 through which the textile web 23 passes while moving in the machine direction (indicated by the direction arrow in FIG. 5). For example, the input power of the microwave generator is suitably in the range of about 1,500 watts to about 6,000 watts. It is understood, however, that in other embodiments the power input may be substantially greater, such as about 75,000 watts or more, without departing from the scope of this invention.

Figure 6:
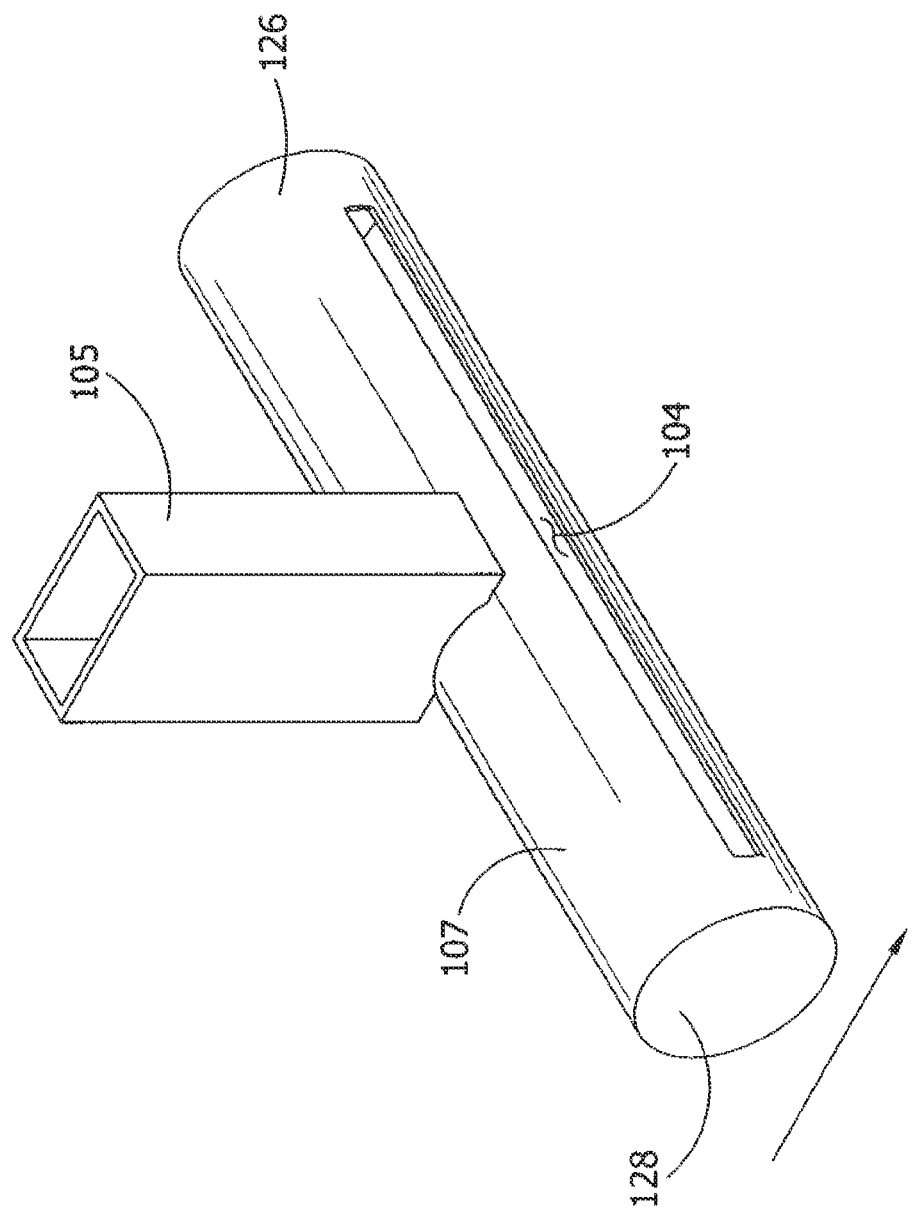
FIG. 6 is a perspective of a second embodiment of a microwave system for use with the apparatus of FIG. 1.

In a particular embodiment, illustrated in FIG. 6, the application chamber 107 comprises a housing 126 operatively connected to the wave-guide 105 and having end walls 128, an entrance opening (not shown in FIG. 6 but similar to an entrance opening 102 shown in FIG. 7) for receiving the textile web 23 into the application chamber, and an outlet opening 104 through which the textile web exits the application chamber for subsequent movement to the wind roll 49. The entrance and exit openings 102, 104 can be suitably sized and configured slightly larger than the textile web 23 so as to allow the textile web, in its open configuration, to pass through the entrance and exit while inhibiting an excessive leakage of energy from the application chamber. The waveguide 105 and application chamber 107 may be constructed from suitable non-ferrous, electrically-conductive materials, such as aluminum, copper, brass, bronze, gold and silver, as well as combinations thereof.

The application chamber 107 in one particularly suitable embodiment is a tuned chamber within which the microwave energy can produce an operative standing wave. For example, the application chamber 107 may be configured to be a resonant chamber. Examples of suitable arrangements for a resonant application chamber 107 are described in U.S. Pat. No. 5,536,921 entitled SYSTEM FOR APPLYING MICROWAVE ENERGY IN SHEET-LIKE MATERIAL by Hedrick et al., issued Jul. 16, 1996; and in U.S. Pat. No. 5,916,203 entitled COMPOSITE MATERIAL WITH ELASTICIZED PORTIONS AND A METHOD OF MAKING THE SAME by Brandon et al, issued Jun. 29, 1999. The entire disclosures of these documents are incorporated herein by reference in a manner that is consistent herewith.

In another embodiment, the effectiveness of the application chamber 107 can be determined by measuring the power that is reflected back from the impedance load provided by the combination of the application chamber 107 and the target material (e.g. the textile web 23) in the application chamber. In a particular aspect, the application chamber 107 may be configured to provide a reflected power which is not more than a maximum of about 50% of the power that is delivered to the impedance load. The reflected power can alternatively be not more than about 20% of the delivered power, and can optionally be not more than about 10% of the delivered power. In other embodiments, however, the reflected power may be substantially zero. Alternatively, the reflected power may be about 1%, or less, of the delivered power, and can optionally be about 5%, or less, of the delivered power. If the reflected power is too high, inadequate levels of energy are being absorbed by the treated textile web 23 and the power being directed into the web is being inefficiently utilized.

The application chamber 107 may also be configured to provide a Q-factor of at least a minimum of about 200. The Q-factor can alternatively be at least about 5,000, and can optionally be at least about 10,000. In other embodiments, the Q-factor can up to about 20,000, or more. If the Q-factor is too low, inadequate electrical field strengths are provided to the treated textile web. The Q-factor can be determined by the following formula (which may be found in the book entitled Industrial Microwave Heating by R. C. Metaxas and R. J. Meredith, published by Peter Peregrinus, Limited, located in London, England, copyright 1983, reprinted 1993):

$$Q\text{-factor}=f_o/\Delta f$$

where:

$f_o$=intended resonant frequency (typically the frequency produced by the high-frequency generator), and $\Delta f$=frequency separation between the half-power points.

In determining the Q-factor, the power absorbed by the treated textile web 23 is deemed to be the power delivered into the application chamber 107 to the web, minus the reflected power returned from the application chamber. The peak-power is the power absorbed by the treated textile web 23 when the power is provided at the intended resonant frequency, $f_o$. The half-power points are the frequencies at which the power absorbed by the treated textile web 23 falls to one-half of the peak-power.

For example, a suitable measuring system can include an HP8720D Dielectric Probe, and a model HP8714C Network Analyzer, both available from Agilent Technologies, a business having offices located at Brookfield, Wis., U.S.A. A suitable procedure for determining the Q-factor is described in the User's Manual dated 1998, part number 08712-90056. Substantially equivalent devices and procedures may also be employed.

In another aspect, the application chamber 107 may be configured for selective tuning to operatively "match" the load impedance produced by the presence of the target material (e.g. the treated textile web 23) in the application chamber. The tuning of the application chamber 107 can, for example, be provided by any of the techniques that are useful for "tuning" microwave devices. Such techniques can include configuring the application chamber 107 to have a selectively variable geometry, changing the size and/or shape of a wave-guide aperture, employing adjustable impedance components (e.g. stub tuners), employing a split-shell movement of the application chamber, employing a variable frequency energy source that can be adjusted to change the frequency of the energy delivered to the application chamber, or employing like techniques, as well as employing combinations thereof. The variable geometry of the application chamber 107 can, for example, be provided by a selected moving of either or both of the end walls 128 to adjust the distance therebetween.

Figure 7:
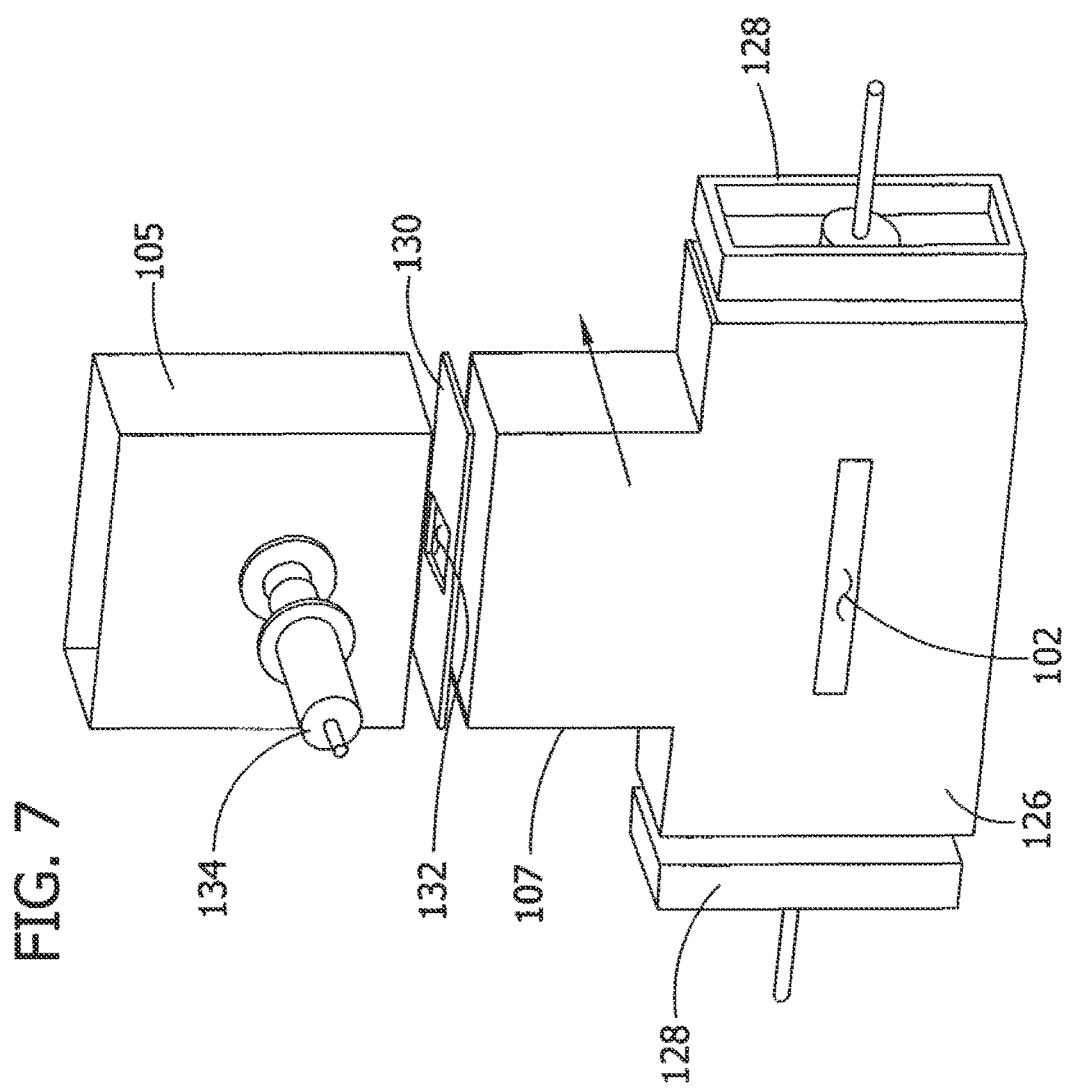
FIG. 7 is a perspective of a third embodiment of a microwave system for use with the apparatus of FIG. 1.

As representatively shown in FIGS. 7-10, the tuning feature may comprise an aperture plate 130 having a selectively sized aperture 132 or other opening. The aperture plate 130 may be positioned at or operatively proximate the location at which the wave-guide 105 joins the application chamber housing 126. The aperture 132 can be suitably configured and sized to adjust the waveform and/or wavelength of the energy being directed into the application chamber 107. Additionally, a stub tuner 134 may be operatively connected to the wave-guide 105. With reference to FIG. 7, the wave-guide 105 can direct the microwave energy into the chamber 107 at a location that is interposed between the two end walls 128. Either or both of the end walls 128 may be movable to provide selectively positionable end-caps, and either or both of the end walls may include a variable impedance device, such as provided by the representatively shown stub tuner 134. Alternatively, one or more stub tuners 134 may be positioned at other operative locations in the application chamber 107.

Figure 8:
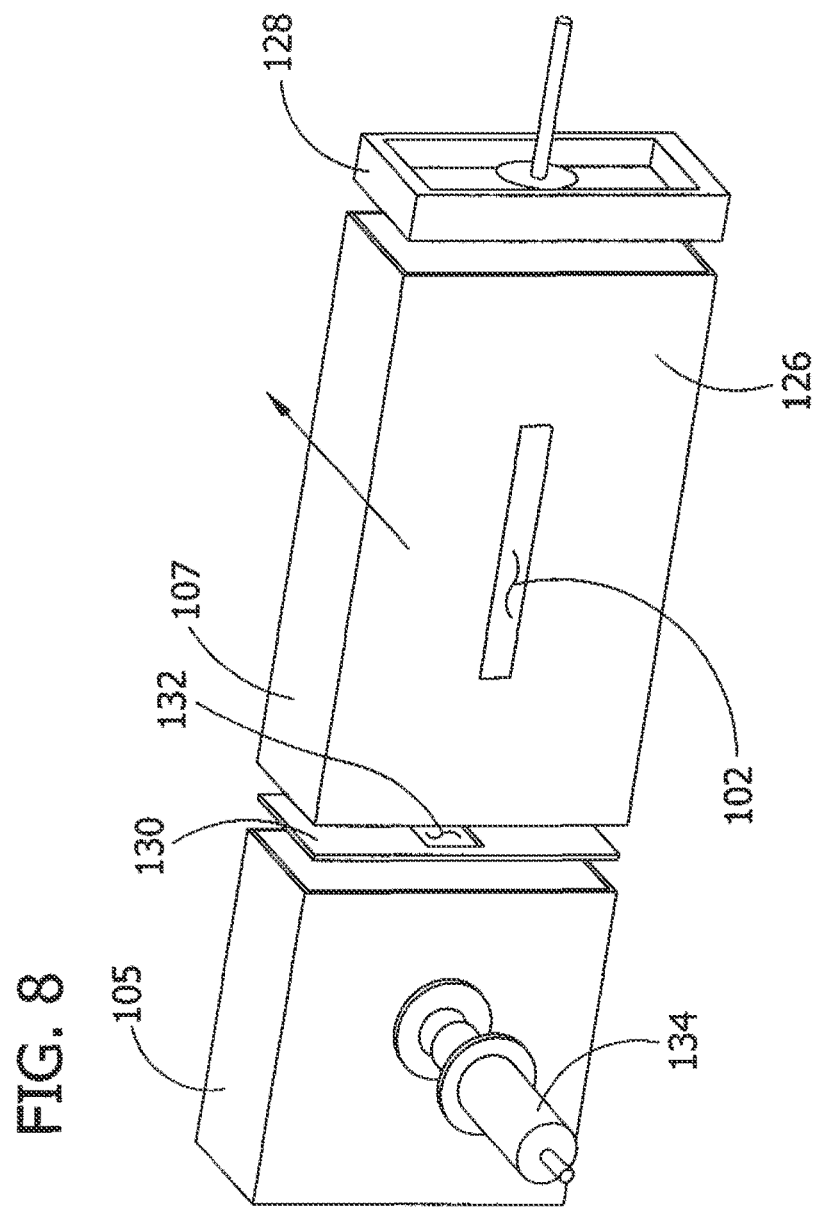
FIG. 8 is a perspective of a fourth embodiment of a microwave system for use with the apparatus of FIG. 1.

With reference to FIG. 8, the wave-guide 105 may be arranged to deliver the microwave energy into one end of the application chamber 107. Additionally, the end wall 128 at the opposite end of the chamber 107 may be selectively movable to adjust the distance between the aperture plate 130 and the end wall 128.

Figure 9:
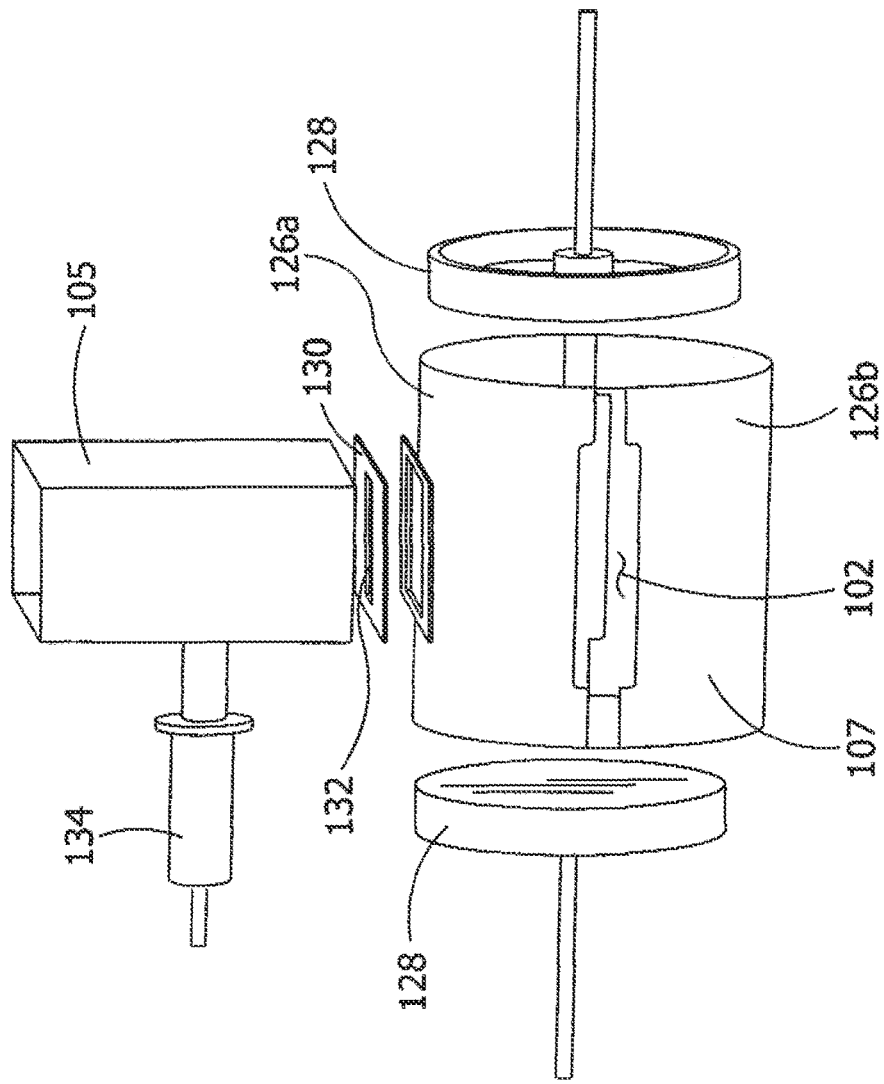
FIG. 9 is a perspective of a fifth embodiment of a microwave system for use with the apparatus of FIG. 1.

In the embodiment illustrated in FIG. 9, the application chamber 107 comprises a housing 126 that is non-rectilinear. In a further feature, the housing 126 may be divided to provide operatively movable split portions 126a and 126b. The chamber split-portions 126a, 126b can be selectively postionable to adjust the size and shape of the application chamber 107. As representatively shown, either or both of the end walls 128 are movable to provide selectively positionable end-caps, and either or both of the end walls may include a variable impedance device, such as provided by the representatively shown stub tuner 134. Alternatively, one or more stub tuners 134 may be positioned at other operative locations in the chamber 107.

To tune the application chamber 107, the appointed tuning components are adjusted and varied in a conventional, iterative manner to maximize the power into the load (e.g. into the dyed textile web), and to minimize the reflected power. Accordingly, the tuning components can be systematically varied to maximize the power into the textile web 23 and minimize the reflected power. For example, the reflected power can be detected with a conventional power sensor, and can be displayed on a conventional power meter. The reflected power may, for example, be detected at the location of an isolator. The isolator is a conventional, commercially available device which is employed to protect a magnetron from reflected energy. Typically, the isolator is placed between the magnetron and the wave-guide 105. Suitable power sensors and power meters are available from commercial vendors. For example, a suitable power sensor can be provided by a HP E4412 CW power sensor which is available from Agilent Technologies of Brookfield, Wis., U.S.A. A suitable power meter can be provided by a HP E4419B power meter, also available from Agilent Technologies.

In the various configurations of the application chamber 107, a properly sized aperture plate 130 and a properly sized aperture 132 can help reduce the amount of variable tuning adjustments needed to accommodate a continuous product. The variable impedance device (e.g. stub tuner 134) can also help to reduce the amount of variable tuning adjustments needed to accommodate the processing of a continuous web 23. The variable-position end walls 128 or end caps can allow for easier adjustments to accommodate a varying load. The split-housing 126a, 126b (e.g., as illustrated in FIG. 9) configuration of the application chamber 107 can help accommodate a web 23 having a varying thickness.

Figure 10:
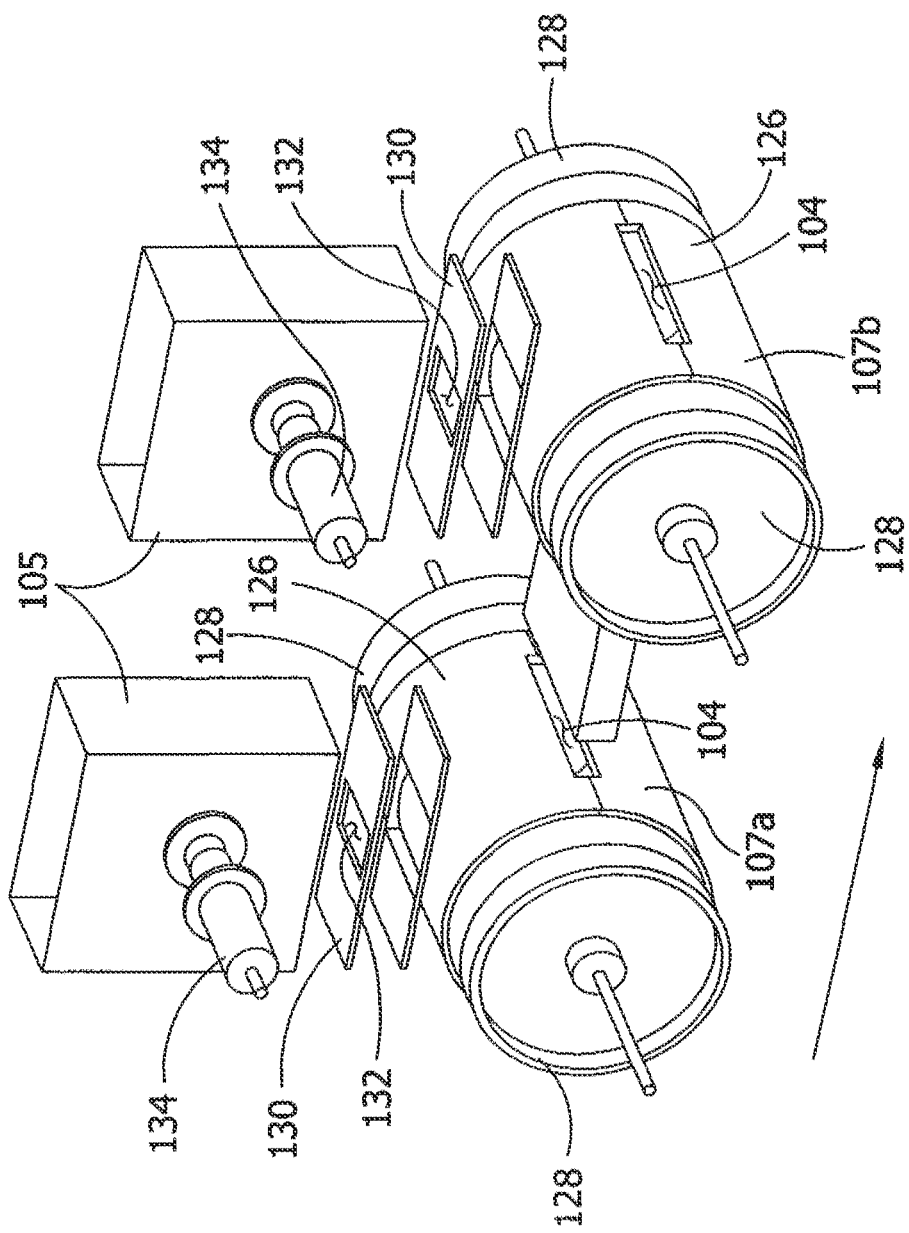
FIG. 10 is a perspective of a sixth embodiment of a microwave system for use with the apparatus of FIG. 1.

In another embodiment, illustrated in FIG. 10, the microwave system 101 may comprise two or more application chamber 107 (e.g. 107a+107b+ . . . ). The plurality of activation chambers 107 can, for example, be arranged in the representatively shown serial array.

As one example of the size of the application chamber 107, throughout the various embodiments the chamber may suitably have a machine-directional (indicated by the direction arrow in the various embodiments) length (e.g., from the entrance 102 to the exit 104, along which the web is exposed to the microwave energy in the chamber) of at least about 4 cm. In other aspects, the chamber 107 length can be up to a maximum of about 800 cm, or more. The chamber 107 length can alternatively be up to about 400 cm, and can optionally be up to about 200 cm. As more particular examples, the chamber 107 length is suitably about 4.4 cm. for an operating frequency of about 5,800 MHz applicator, about 8.9 cm. for an operating frequency of about 2,450 MHz. and about 25 cm. for an operating frequency of about 915 MHz for tuned circular cavities. Such lengths may be much longer for multi-mode microwave systems.

Where the microwave system 101 employs two or more application chambers 107 arranged in series, the total sum of the machine-directional lengths provided by the plurality of chambers may be at least about 10 cm and proportionally longer for lower frequencies. For example, in other aspects the total of the chamber 107 lengths can be up to a maximum of about 3000 cm, or more. The total of the chamber 107 lengths can alternatively be up to about 2000 cm, and can optionally be up to about 1000 cm.

The total residence time within the application chamber 107 or chambers can provide a distinctively efficient dwell time. The term "dwell time" in reference to the microwave system 101 refers to the amount of time that a particular portion of the dyed textile web 23 spends within the application chamber 107, e.g., in moving from the entrance opening 102 to the exit opening 104 of the chamber. In a particular aspect, the dwell time is suitably at least about 0.0002 sec. The dwell time can alternatively be at least about 0.005 sec, and can optionally be at least about 0.01 sec. In other embodiments the dwell time can be up to a maximum of about 3 sec, more suitably up to about 2 sec, and optionally up to about 1.5 sec.

In operation, after the treated textile web 23 is moved past the second ultrasonic vibration system 161, the web is moved (e.g., drawn, in the illustrated embodiment) through the application chamber 107 of the microwave system 101. The microwave system 101 is operated to direct microwave energy into the application chamber 107 for absorption by at least one of and more suitably both of the first and second treatment agents (e.g., which in one embodiment suitably has an affinity for, or couples with, the microwave energy). The treatment agents are thus heated rapidly, thereby substantially speeding up the rate at which the treatment agents become bound to the textile web 23 (e.g., as opposed to conventional heating methods such as curing in an oven). The web is subsequently moved downstream of the microwave system 101 for subsequent post-processing.

Figure 11:
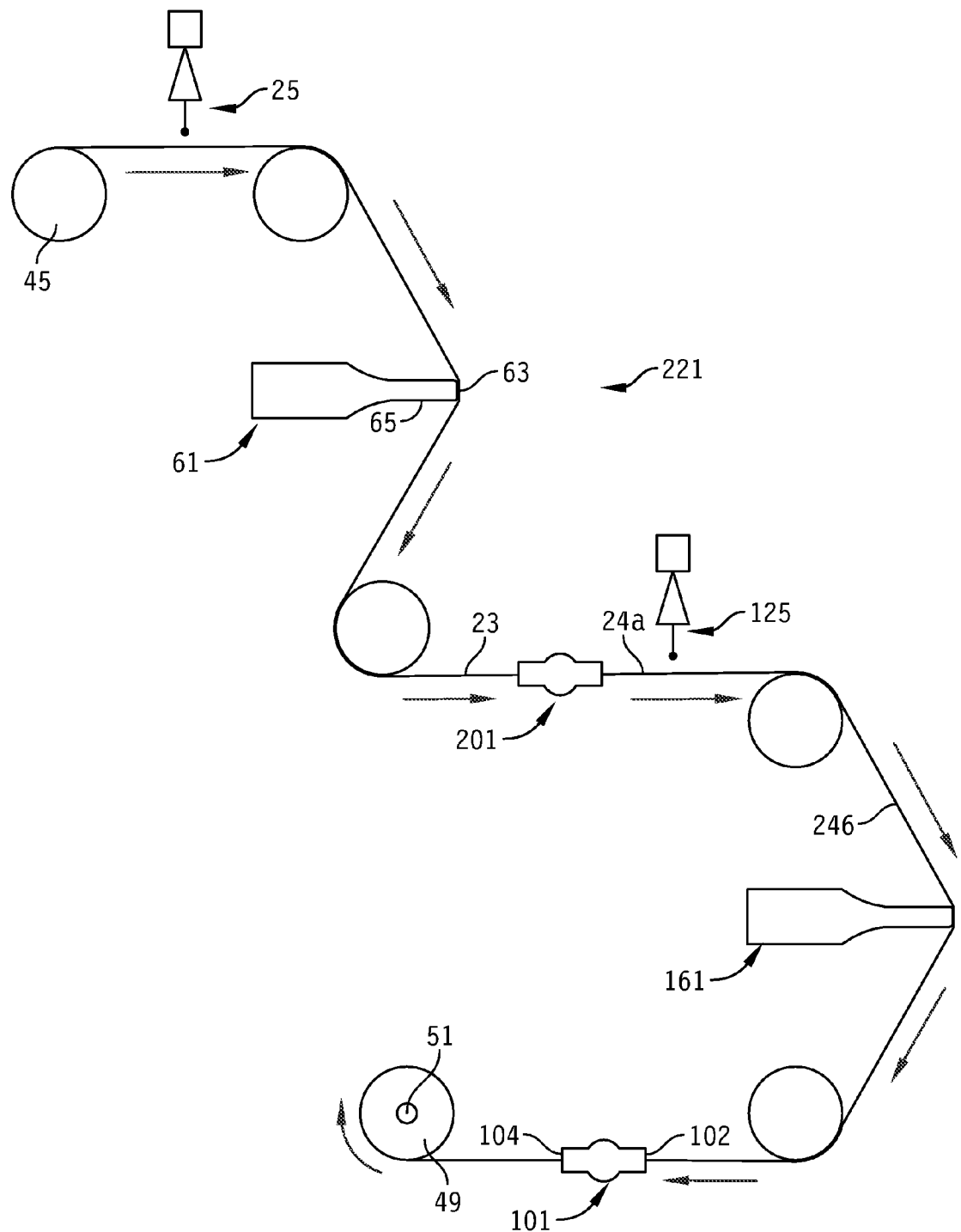
FIG. 11 is a schematic of apparatus for treating a textile web according to a second embodiment of a process for applying multiple treatment agents to a textile web.

FIG. 11 illustrates apparatus 221 for treating a textile web 23 according to a second embodiment of a process for applying one or more treatment agents to a textile web. The apparatus 221 is similar to that of FIG. 1 including in sequence a first applicating device 25 for applying a first treatment agent to the textile web 23, a first ultrasonic vibration system 61, a second applicating device 125 for applying a second treatment agent to the textile web, a second ultrasonic vibration system 161, and a microwave system 101. In this particular apparatus 221, another microwave system 201 is located between first ultrasonic vibration system 61 and the second applicating device 125. In this manner, after operating the first ultrasonic vibration system 61 to facilitate migration of the first treatment agent into and through the textile web 23, the web is moved through this additional microwave system 201 to facilitate binding of the first treatment agent within the web prior to the second treatment agent being applied to the web by the second applicating device 125.

Figure 12:
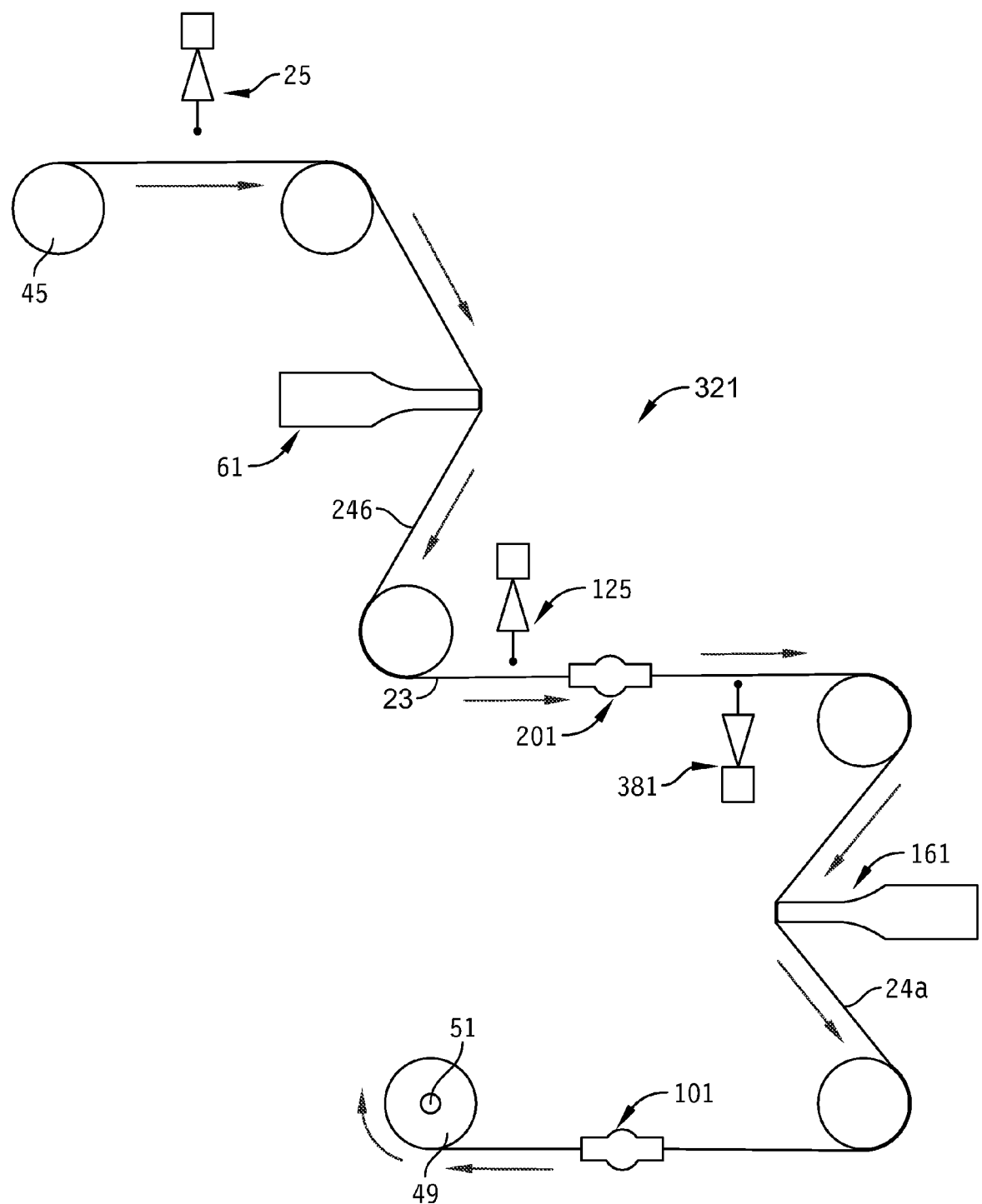
FIG. 12 is a schematic of apparatus for treating a textile web according to a third embodiment of a process for applying multiple treatment agents to a textile web.

In another embodiment for carrying out a process for applying one or more treatment agents to a textile web 23, illustrated in FIG. 12, apparatus 321 for carrying out such a process is similar to the apparatus 221 of FIG. 11 with the addition of a third applicating device 381 for applying a surface coating or other material to one or both faces 24a, 24b of the web. This third applicating device 321 is located in the illustrated embodiment after the first ultrasonic vibration system 61 and prior to the first microwave system 201. Accordingly, in operation the first ultrasonic vibration system 61 operates to facilitate migration of the first treatment agent into and through the web 23. A surface coating is then applied to the face 24a of the web by the third applicating device 381 and then the web is moved through the first microwave system 201 to facilitate binding of the first treatment agent within the web and to facilitate binding of the surface coating to the one face 24a of the textile web. The second applicating device 125, located after the first microwave system 201, is configured and arranged to apply the second treatment agent to the opposite face 24b of the textile web 23 prior to the web being subjected to ultrasonic energy by the second ultrasonic vibration system 161.

Figure 13:
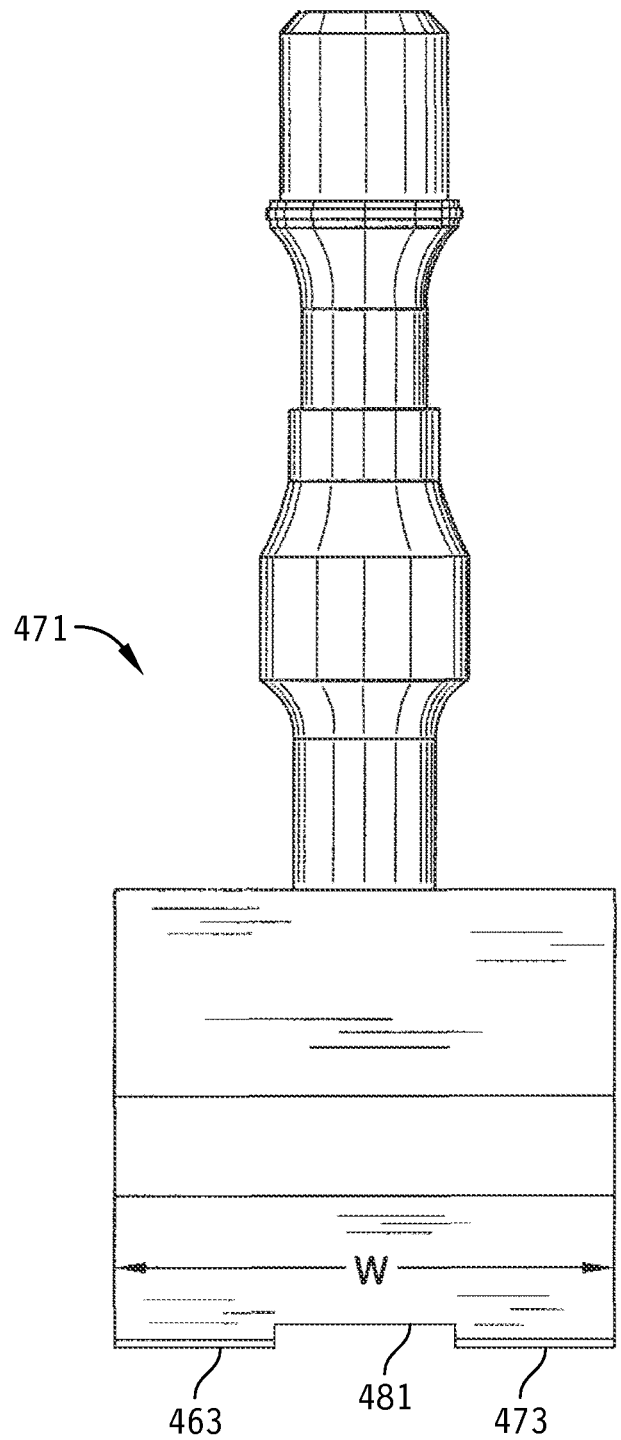
FIG. 13 is a schematic elevation of an alternative embodiment of an ultrasonic horn for use with the apparatus of any of FIGS. 1, 11 and 12.

Referring now to FIG. 13, in another embodiment an ultrasonic horn 471 of the second ultrasonic vibration system 161 of any of the above-described apparatus 21, 221, 321 may replace the horn 71 of the system 61 of FIG. 2 and be configured instead to facilitate a non-uniform migration of the second treatment agent into the textile web 23. For example, the ultrasonic horn illustrated in FIG. 13 has one or more transverse gap segments 481 (one is shown in FIG. 13) that terminate short of the contact surface 463 of the horn. The relative depth (i.e., the spacing from the contact surface) of each gap segment is suitably relatively small so as not to compromise the integrity of the ultrasonic horn 471. It is understood, however, that the gap segments 481 may be of any suitable depth without departing from the scope of this invention. It is also contemplated that the ultrasonic horn 471 may comprise two or more transverse segments spaced transversely from each other to define open gap segments transversely therebetween.

In operation, the first treatment agent is applied to the textile web 23 and the first ultrasonic vibration system 61 imparts ultrasonic energy to the web to facilitate a generally uniform migration of the first treatment agent into and through the web in the manner described previously herein. The second treatment agent is then applied to the web by the second applicating device 125. Subsequently, the web 23 is moved past the second ultrasonic vibration system 161 in its open configuration. As the web 23 passes over the terminal end 473 of the ultrasonic horn 471 (FIG. 13) of the second ultrasonic vibration system 161, one or more transverse portions of the textile web (depending on the configuration of the ultrasonic horn) contact the contact surface 463 of the ultrasonic horn while those transverse portions of the web that pass over the gap segments 481 of the horn are out of contact with the horn. As a result, ultrasonic energy is not imparted to those transverse portions of the textile web 23 (or substantially less energy is imparted thereto) that pass over the gap segments 481 compared to those transverse portions that are in direct contact with the contact surface 463 of the horn 471.

In this manner, the migration of the second treatment agent into and through a second thickness of the web 23 occurs only at those portions of the web that are in direct contact with the horn 471 while the second treatment migrates substantially less, or remains substantially at the face of the web, at those transverse portions of the web that pass over the gap segments 481 of the horn. The resultant web 23 thus has a non-uniform distribution of the second treatment agent across the transverse direction of the web. For example, one or more transverse portions of the web 23 will have only the first treatment agent therein while other transverse portions of the web will have the first treatment agent coated by or otherwise interspersed with the second treatment agent. It is contemplated that the horn configuration 471 illustrated in FIG. 13 may also, or may instead, be used for the first ultrasonic vibration system 61 without departing from the scope of this invention.

While each of the illustrated apparatus 21, 221, 321 and the processes described above comprise the application of two or more treatment agents to the textile web during processing, it is understood that only a single treatment agent may be applied to the textile web and subjected to ultrasonic vibration, with or without subsequent heating or microwave exposure, and remain within the scope of this invention. For example, in a particularly suitable embodiment, the textile web 23 may comprise a non-woven web constructed of multicomponent thermoplastic fibers as described previously herein for use as a filter medium. The treatment agent in such an embodiment may be any liquid treatment agent and is applied to one face 24a of the web such that upon the application of ultrasonic energy to the web by the ultrasonic vibration system 61 the treatment agent is readily drawn from the one face 24a entirely through the web to the opposite face 24b of the web.

Ultrasonic energy applied to textile web 23 heats the thermoplastic fibers to relatively soften the fibers. As a result of the flow of the liquid treatment agent through the thickness of the web, the relatively softened fibers within the web are induced by the flow of liquid to become more oriented in the direction of flow (e.g., from the one face toward the opposite face of the web). Accordingly, fibers that are disposed at or near the opposite face 24b upon re-orientation tend to stick out slightly from the opposite face of the web, thereby substantially increasing the web surface area available for filtering. Such an arrangement also decreases the air frictional drag across the fibers (e.g., through the thickness of the web). It is also contemplated that following such a process the web 23 may be further treated with additional treatment agents as in any of the embodiments described previously.

In another example, the treatment agent may comprise a fiber softening agent such as a solvent so that the fibers soften upon application of the treatment agent to the one face 24a of the web by the applicating device 25. In particular, the solvent works into the fibers, partially dissolving the fibers so that they soften prior to the web 23 being subjected to ultrasonic energy. As the web is moved over the contact surface of the ultrasonic vibration system 61, the ultrasonic energy applied to the web 23 causes the solvent to flash into a vapor, resulting in substantial pressure within the fibers. The fibers thus at least partially fracture, resulting in small strands of fiber material sticking out from the fiber to increase the web surface area available for filtering, and more suitably the fibers fracture apart into smaller fibers to increase web surface area. Such fracturing also provides for reduced pressure drop across (e.g., through the thickness of) the web. It is also contemplated that following such a process the web may be further treated with additional treatment agents as in any of the embodiments described previously.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A process for treating a textile web, said textile web having a first face, a second face opposite the first face, and a thickness, said process comprising:

applying a first treatment agent to the textile web;

moving the web with the first treatment agent applied thereto in an open configuration thereof over a contact surface of an ultrasonic vibration system with the textile web in direct contact with the contact surface of the ultrasonic vibration system;

operating the ultrasonic vibration system to impart ultrasonic energy to said textile web to facilitate the distribution of said first treatment agent through a first extent of said thickness of the textile web;

applying a second treatment agent to the textile web other than by saturating the textile web with said second treatment agent;

moving the web with the second treatment agent applied thereto in an open configuration thereof over a contact surface of an ultrasonic vibration system with the textile web in direct contact with the contact surface of the ultrasonic vibration system; and operating the ultrasonic vibration system to impart ultrasonic energy to said textile web to facilitate the distribution of said second treatment agent through a second extent of said thickness of the web, said second extent being different than said first extent such that at least a portion of the first extent of the thickness of the textile web is free from the second treatment agent.

2. The process set forth in claim 1 wherein the second treatment agent is different from the first treatment agent.

3. The process set forth in claim 1 wherein the step of applying a first treatment agent to the textile web comprises applying said first treatment agent to the first face of the textile web, the step of operating the ultrasonic vibration system to facilitate distribution of said first treatment agent comprising operating the ultrasonic vibration system to impart ultrasonic energy to said textile web to facilitate the distribution of said first treatment agent from said first face toward said second face of the textile web through a first extent of said thickness of the textile web.

4. The process set forth in claim 3 wherein the step of applying a second treatment agent to the textile web comprises applying said second treatment agent to the first face of the textile web, the step of operating the ultrasonic vibration system to facilitate distribution of said second treatment agent comprising operating the ultrasonic vibration system to impart ultrasonic energy to said textile web to facilitate the distribution of said second treatment agent from said first face toward said second face of the textile web through a second extent of said thickness of the textile web, said second extent being less than said first extent.

5. The process set forth in claim 3 wherein the step of moving the textile web over the contact surface of an ultrasonic vibration system comprises moving said web over said contact surface with the second face of said web in direct contact with said contact surface of the ultrasonic vibration system.

6. The process set forth in claim 1 further comprising moving the textile web in its open configuration through a microwave application chamber of a microwave system subsequent to imparting ultrasonic energy to said web to facilitate the distribution of said second treatment agent material through said second extent of said thickness of the web; and operating the microwave system to impart microwave energy to the web in the microwave application chamber.

7. The process set forth in claim 6 further comprising the step of moving the textile web in its open configuration through a microwave application chamber of a microwave system prior to applying the second treatment agent to the textile web; and operating the microwave system to impart microwave energy to the web in the microwave application chamber to facilitate binding of the first treatment agent to the web.

8. The process set forth in claim 1 further comprising the step of moving the textile web in its open configuration through a microwave application chamber of a microwave system prior to applying the second treatment agent to the textile web; and operating the microwave system to impart microwave energy to the web in the microwave application chamber to facilitate binding of the first treatment agent to the web.

9. The process set forth in claim 1 wherein the step of applying a first treatment agent to the textile web comprises applying a liquid treatment agent to the textile web, the step of applying a second treatment agent to the textile web comprising applying a particulate treatment agent to the textile web.

10. The process set forth in claim 1 wherein the step of applying a first treatment agent to the textile web comprises applying a first treatment agent to the textile web other than by saturating the web with said first treatment agent.

11. A process for treating a textile web, said textile web having a first face and a second face opposite the first face, said process comprising:
- applying a first treatment agent to the textile web;
- moving the web with the first treatment agent applied thereto in an open configuration thereof in a longitudinal direction of the web over a contact surface of an ultrasonic vibration system with the textile web in direct contact with the contact surface of the ultrasonic vibration system;
- operating the ultrasonic vibration system to impart ultrasonic energy to said textile web to facilitate the distribution of said first treatment agent within the textile web;
- applying a second treatment agent to the first face of the textile web;
- moving the web with the second treatment agent applied thereto in an open configuration thereof in a longitudinal direction of the web over a contact surface of an ultrasonic vibration system with the textile web in direct contact with the contact surface of the ultrasonic vibration system; and
- operating the ultrasonic vibration system to impart ultrasonic energy to said textile web to facilitate distribution of the second treatment agent within the web from the first face of the textile web toward the second face thereof, said distribution being non-uniform across a transverse direction of the web such that the first treatment agent extends over a greater transverse portion of the textile web than the second treatment agent.

12. The process set forth in claim 11 wherein the step of moving the web with the second treatment agent applied thereto comprises moving the web with the second treatment agent applied thereto in an open configuration thereof in a longitudinal direction of the web over a contact surface of an ultrasonic vibration system with at least one transverse portion of the textile web free from contact with the contact surface of the ultrasonic vibration system and at least one other transverse portion of the textile web in direct contact with the contact surface of the ultrasonic vibration system.

13. The process set forth in claim 11 wherein the second treatment agent is different from the first treatment agent.

14. The process set forth in claim 11 wherein the step of applying a first treatment agent to the textile web comprises applying said first treatment agent to the first face of the textile web, the step of operating the ultrasonic vibration system to facilitate distribution of said first treatment agent comprising operating the ultrasonic vibration system to impart ultrasonic energy to said textile web to facilitate the distribution of said first treatment agent with the web from said first face toward said second face of said web.

15. The process set forth in claim 14 wherein the step of moving the textile web over the contact surface of an ultrasonic vibration system comprises moving said web over said contact surface with the second face of said web in direct contact with said contact surface of the ultrasonic vibration system.

16. The process set forth in claim 11 further comprising moving the textile web in its open configuration through a microwave application chamber of a microwave system subsequent to imparting ultrasonic energy to said web to facilitate the distribution of said second treatment agent material within the web; and
- operating the microwave system to impart microwave energy to the web in the microwave application chamber.

17. The process set forth in claim 16 further comprising the step of moving the textile web in its open configuration through a microwave application chamber of a microwave system prior to applying the second treatment agent to the textile web; and
- operating the microwave system to impart microwave energy to the web in the microwave application chamber to facilitate binding of the first treatment agent to the web.

18. The process set forth in claim 11 further comprising the step of moving the textile web in its open configuration through a microwave application chamber of a microwave system prior to applying the second treatment agent to the textile web; and
- operating the microwave system to impart microwave energy to the web in the microwave application chamber to facilitate binding of the first treatment agent to the web.

19. The process set forth in claim 11 wherein the step of applying a first treatment agent to the textile web comprises applying a liquid treatment agent to the textile web, the step of applying a second treatment agent to the textile web comprising applying a particulate treatment agent to the textile web.

* * * * *